(12) United States Patent
Vishnu et al.

(10) Patent No.: US 6,456,592 B1
(45) Date of Patent: Sep. 24, 2002

(54) METHOD AND APPARATUS FOR A SIMPLE EXPLICIT RATE INDICATION ALGORITHM (SERIA)

(75) Inventors: Meenarachagan Vishnu, Cranberry; Debashis Basak, Allison Park; Hyong S. Kim, Pittsburgh, all of PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/129,284

(22) Filed: Aug. 5, 1998

(51) Int. Cl.⁷ .............................................. H04L 12/26
(52) U.S. Cl. .................................... 370/232; 370/236.1
(58) Field of Search .............................. 370/229, 230, 370/231, 232, 233, 234, 235, 236, 412, 236.1, 468

(56) References Cited

U.S. PATENT DOCUMENTS

| | | | | |
|---|---|---|---|---|
| 5,737,313 A | * | 4/1998 | Kolarov et al. ............. | 370/234 |
| 5,909,443 A | * | 6/1999 | Fichou et al. ............... | 370/412 |
| 5,991,266 A | * | 11/1999 | Zheng ........................ | 370/229 |
| 6,061,330 A | * | 5/2000 | Johansson ................... | 370/229 |
| 6,081,843 A | * | 6/2000 | Kilkki et al. ................ | 709/232 |
| 6,141,321 A | * | 10/2000 | Lee ............................ | 370/229 |
| 6,178,159 B1 | * | 1/2001 | He et al. .................... | 370/234 |

* cited by examiner

Primary Examiner—Min Jung
(74) Attorney, Agent, or Firm—Ansel M. Schwartz

(57) ABSTRACT

An apparatus for switching cells from entities in a network. The apparatus includes an input mechanism for receiving all cells by the apparatus from the network. The apparatus includes a memory mechanism for storing all cells received by the input mechanism that are to be stored in the apparatus. The memory mechanism is connected to the input port mechanism. The memory mechanism has an occupancy for cells. The apparatus includes an output mechanism for sending cells from the apparatus to the network. The apparatus includes a server for providing service to the cells at a service rate. The server is connected to the memory mechanism and the output mechanism. The apparatus includes a scheduler for providing service to the cells in the memory mechanism. The scheduler is connected to the server and the memory mechanism. A method for switching cells. An ATM switch which stamps Explicit Rate to ABR VCs for controlling ABR traffic flow on a given link of the ATM switch.

32 Claims, 24 Drawing Sheets

METHOD AND APPARATUS FOR A SIMPLE EXPLICIT RATE INDICATION ALGORITHM (SERIA)

FIELD OF THE INVENTION

The present invention is related to a method and apparatus for switching cells with a scheduler as a function of a memory mechanism's occupancy. More specifically, the present invention is related to an ATM switch which stamps explict rate to ABR VCs for controlling ABR traffic flow on a given link of the ATM switch with a scheduler as a function of a memory mechanism's occupancy.

BACKGROUND OF THE INVENTION

The Available Bit Rate (ABR) service of ATM networks was defined for bursty data applications which can adapt to time-varying bandwidth but which require low cell loss rate [ATM Forum. Traffic management specification version 4.0, April 1996]. ABR virtual connections (VCs) share the available bandwidth fairly, where the available bandwidth is the bandwidth leftover by the constant bit rate (CBR) and variable bit rate (VBR) traffic streams. In addition to getting a fair share of the available bandwidth, an ABR VC can also specify a minimum cell rate (MCR) which, once the ABR VC is admitted, is guaranteed.

The network provides the ABR sources with feedback information regarding the available bandwidth. Two feedback control approaches were studied: In the credit-based approach, a network node sends per-VC credits to the upstream node and the upstream node uses up a credit when it transmits a cell belonging to the VC. In the rate-based approach, the source periodically sends Resource Management (RM) cells which are turned back by the destination. The switches along the VC route indicate their congestion status in the returning RM cell.

Although, the credit-based approach (see e.g., [H. Kung and R. Morris. Credit-based flow control for ATM networks. *IEEE Networks,* 9 (2):40–48, March/April 1995]) is conceptually simpler and guarantees zero cell losses, the ATM Forum selected the rate-based approach (see e.g., [F. Bonomi and K. Fendick. The rate-based flow control framework for the available bit rate ATM service. *IEEE Networks,* 9(2):25–39, March/April 1995]) because it offered greater architectural flexibility. The complexity of the switch algorithm under the rate-based approach can be as simple as marking a congestion bit to as complex as computing an explicit rate (ER).

The ATM Forum defined the behavior of the end systems but left the details of the ABR switch algorithm design to the ATM switch designers. Several ER computing switch algorithms have been proposed and they essentially fall into two categories: exact fair share and approximate fair share computing algorithms. An exact fair share computing algorithm such as ERICA, ERICA+ [R. Jain, S. Kalyanaraman, R. Goyal, Fahmy S., and R. Viswanathan. ERICA switch algorithm: A complete description. ATM Forum Document Number: ATM Forum/96-1172, August 1996] and EDERA [N. Ghani. *Available Bit Rate Service in ATM Networks.* PhD thesis, University of Waterloo, 1997] measures the net available bandwidth of the switch output port and the number of active ABR VCs passing through the port. It then computes the fair share by dividing the available bandwidth by the number of active ABR VCs. On the other hand, an approximate fair share computing algorithm sch as the PRCA and EPRCA [L. Roberts. Enhanced PRCA (proportinal rate-control algorithm). ATM Forum Document: AF-TM 94-0735R1, August 1994], DMRCA and EDMRCA [F. M. Chiussi and Y. T. Wang. An ABR rate-based congestion control algorithm for ATM switches with per-VC queueing. In GLOBECOM '97, pages 771–778, 1997] avoids the floating-point division operation. It maintains port variables which are adjusted according to the congestion status of the switch output port. The ER of each VC is determined from these port variables. In general, the exact fair share computing algorithms perform better than the approximate fair share computing algorithms [N. Ghani. *Available Bit Rate Service in ATM Networks.* PhD thesis, University of Waterloo, 1997].

An important problem associated with the exact fair-share computing approach is the redistribution of bandwidth from ABR VCs bottle-necked elsewhere to those bottle-necked at the switch. For example, consider three active ABR VCs each with zero MCR, and let the net available bandwidth be 30 Mbits/sec, then the fair share for each ABR VC is 10 Mbits/sec. Assume that the first two ABR VCs are bottle-necked at the switch whereas the third ABR VC is bottle-necked at some other switch which prevents the third ABR VC from using more than 5 Mbits/sec. This implies that a bandwidth of 30−(10+10+5)=5 Mbits/sec has to be redistributed among the first two ABR VCs. Thus, the fair shares for the three VCs should be 12.5, 12.5, and 5.0 Mbits/sec, respectively.

The Explicit Rate Indication for Congestion Avoidance (ERICA), and ERICA+ [R. Jain, S. Kalyanaraman, R. Goyal, Fahmy S., and R. Viswanathan. Determining the number of active ABR sources in switch algorithms. ATM Form Document Number: ATM Forum/98-0154, February 1998; R. Jain, S. Kalyanaraman, R. Goyal, Fahmy S., and R. Viswanathan. ERICA switch algorithm: A complete description. ATM Form Document Number: ATM Forum/96-1172, August 1996] employ complex schemes for the redistribution which require the measurement of per-VC service rates. For example, ERICA+ solves the redistribution problem by dividing the available bandwidth by the effective number of active ABR VCs, rather than by the number of active ABR VCs. The effective number of active ABR VCs is defined as follows: The ABR VCs which are bottle-necked at the switch are counted as one whereas those which are bottle-necked elsewhere are counted only as a fraction equal to (Actual VC rate/Fair Share). Thus, to compute the effective number of active ABR VCs, the cell rate of each VC has to be measured at the switch port. The measurements of VC rate entails algorithms with O(n) space compleity and/or O(n) time complexity, where n is the number of VCs passing through the port. Hence, such switch algorithms are very expensive to implement in high-speed hardware.

The Enhanced Distributed Explicit Rate Algorithm (EDERA) [N. Ghani. *Available Bit Rate Service in ATM Networks.* PhD thesis, University of Waterloo, 1997] solves the redistribution problem by explicitly keeping track of the ABR VCs which are bottle-necked at the switch versus those bottle-necked elsewhere. EDERA assumes that the ABR sources indicate their segmented average source rate (SASR) in the RM cells where SASR is defined as the ratio of number of data cells between two RM cells to the time between the two RM cells. Note that SASR will be less than Allowed Cell Rate (ACR) if the VC is bottle-necked at some point in the network. Since the ATM Forum standards [ATM Forum. Traffic management specification version 4.0, April 1996] have opted not to include SASR indications in the RM cells, the EDERA scheme has to be suitably modified. Such a modification entails the measurement of VC rates at the switch output ports.

The present invention is directed to a novel ABR switch algorithm, Simple Explicit Rate Indication Algorithm (SERIA). Unlike ERICA, ERICA+ and EDERA, SERIA does not need to measure per-VC rates. In fact, SERIA is much simpler than the previously proposed exact fair share computing switch algorithms: The number of arithmetic and logical operations needed to handle events such as cell arrival and cell departure is a small number independent of the number of VCs. The simplicity of SERIA makes it particularly attractive for high speed implementations [M. Vishnu, D. Basak, and H. S. Kim. Method and apparatus for a simple explicit rate indication algorithm (SERIA) U.S. Patent Pending, 1998].

Extensive simulation results show that SERIA provides max-min fairness, converges to steady state quickly, utilizes 100% of the link bandwidth, and maintains tight buffer control.

SUMMARY OF THE INVENTION

The present invention pertains to an apparatus for switching cells from entities in a network. The apparatus comprises an input mechanism for receiving all cells by the apparatus from the network. The apparatus comprises a memory mechanism for storing all cells received by the input mechanism that are to be stored in the apparatus. The memory mechanism is connected to the input port mechanism. The memory mechanism has an occupancy for cells. The apparatus comprises an output mechanism for sending cells from the apparatus to the network. The apparatus comprises a server for providing service to the cells at a service rate. The server is connected to the memory mechanism and the output mechanism. The apparatus comprises a scheduler for providing service to the cells in the memory mechanism. The scheduler is connected to the server and the memory mechanism.

The present invention pertains to a method for switching cells. The method comprises the steps of receiving cells of J entities, where J is greater than or equal to 1, from a network at an input mechanism of a switch. Then there is the step of storing the cells in the memory mechanism of the switch. Next there is the step of providing service to the cells in the memory mechanism by a server. Then there is the step of scheduling with a scheduler of the switch when cells in the memory mechanism are to receive service from a server of the switch as a function of the occupancy of the memory mechanism by cells.

The present invention pertains to an ATM switch which stamps Explicit Rate to ABR VCs for controlling ABR traffic flow on a given link of the ATM switch. The apparatus comprises input port mechanisms carrying traffic for VCs into the switch. The apparatus comprises a memory mechanism for storing all cells of VCs received by the input port mechanisms that are to be stored in the switch. The memory mechanism is connected to the input port mechanisms. The memory mechanism has an occupancy for cells of VCs. The apparatus comprises output port mechanisms for sending cells from the switch to the network. The apparatus comprises a switching fabric to switch a cell of a VC from an input port mechanism to an output port mechanism. The apparatus comprises a ABR-ER mechanism for computing explicit rate (ER) and stamping rate on backward RM cells. The apparatus comprises a server for providing service to the cells of VCs at a service rate. The server is connected to the memory mechanism and the output port mechanisms. The apparatus comprises a scheduler for providing service to the cells of the VCs as a function of the memory mechanism's occupancy by the cells of the VCs, and the scheduler is connected to the server and the memory mechanism.

BRIEF DESCRIPTION OF THE DRAWINGS

In the accompanying drawings, the preferred embodiment of the invention and preferred methods of practicing the invention are illustrated in which.

DETAILED DESCRIPTION

Figure 9:
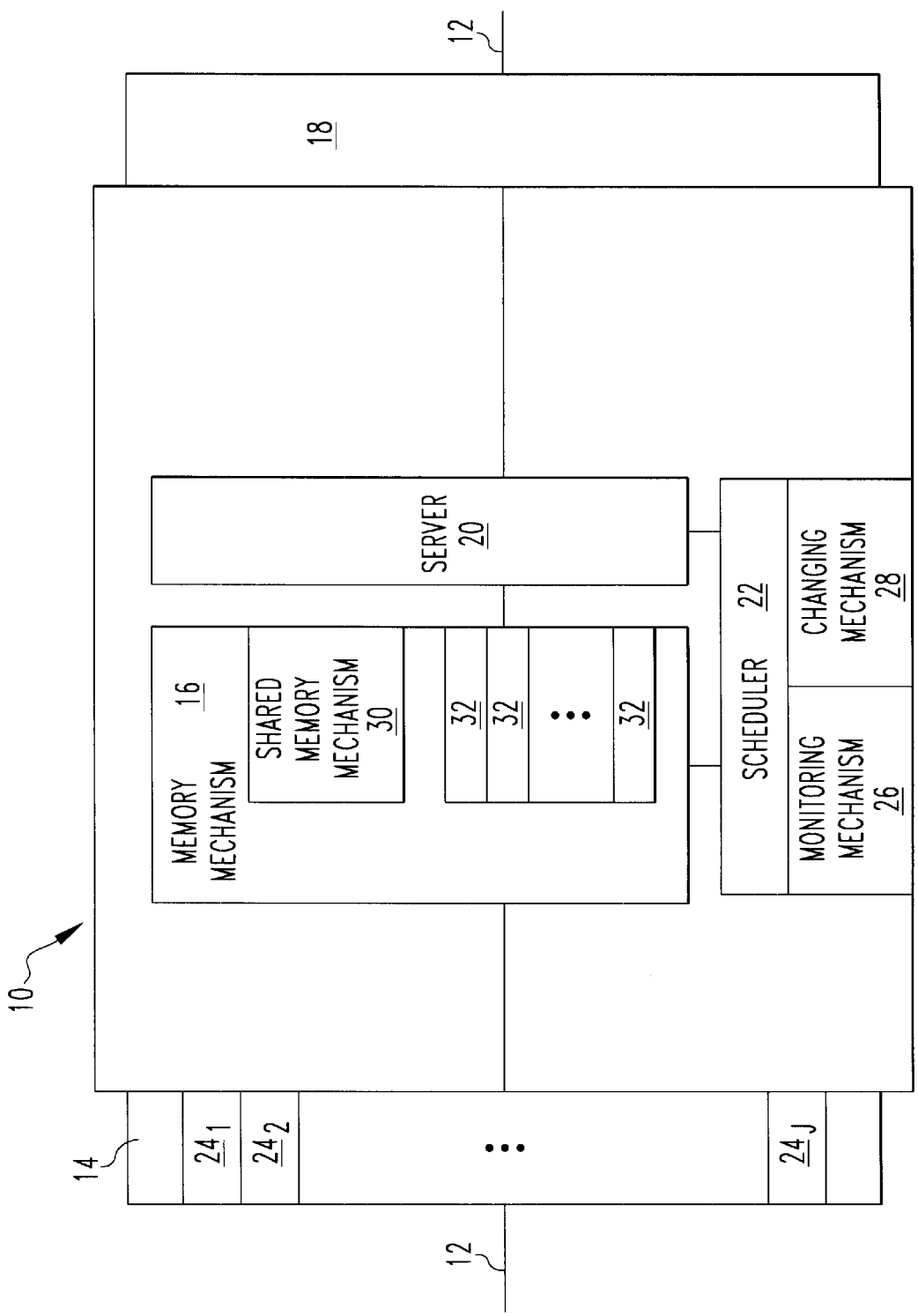
FIG. 9 is a schematic representation of the apparatus of the present invention.
Figure 10:
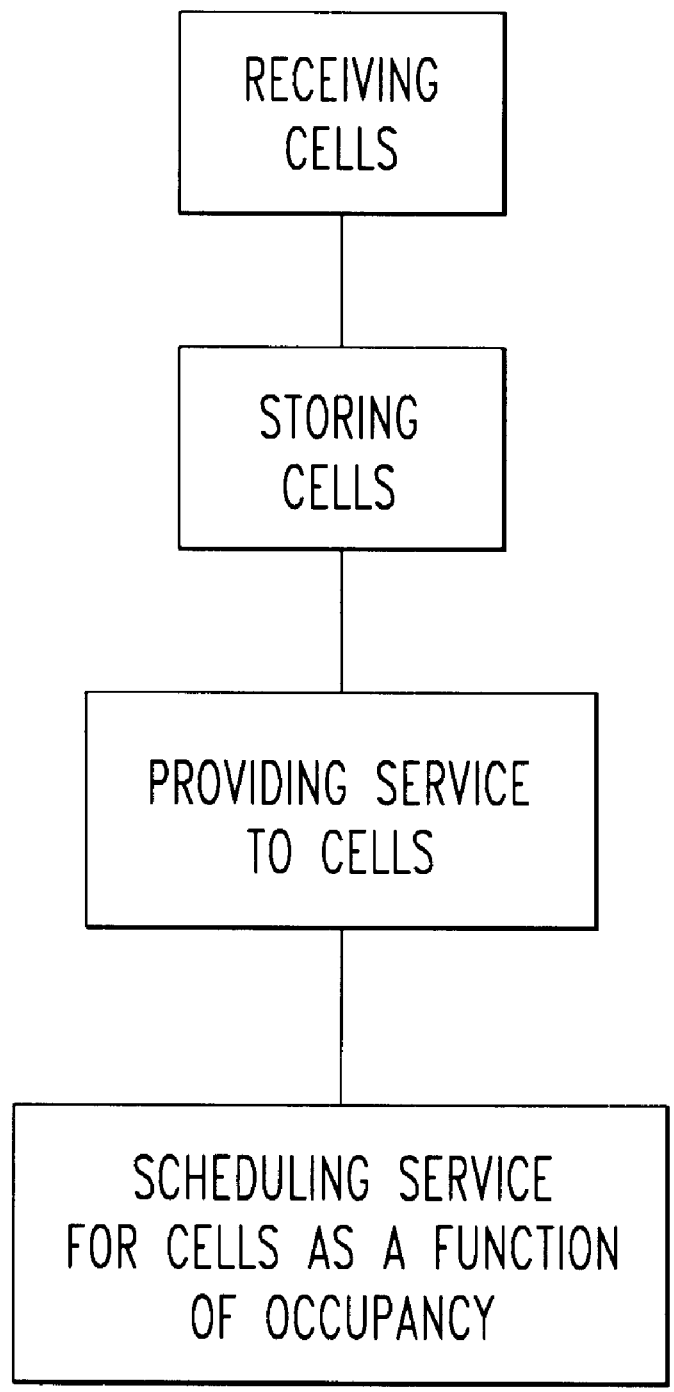
FIG. 10 is a flow chart of the method of the present invention.
Figure 11:
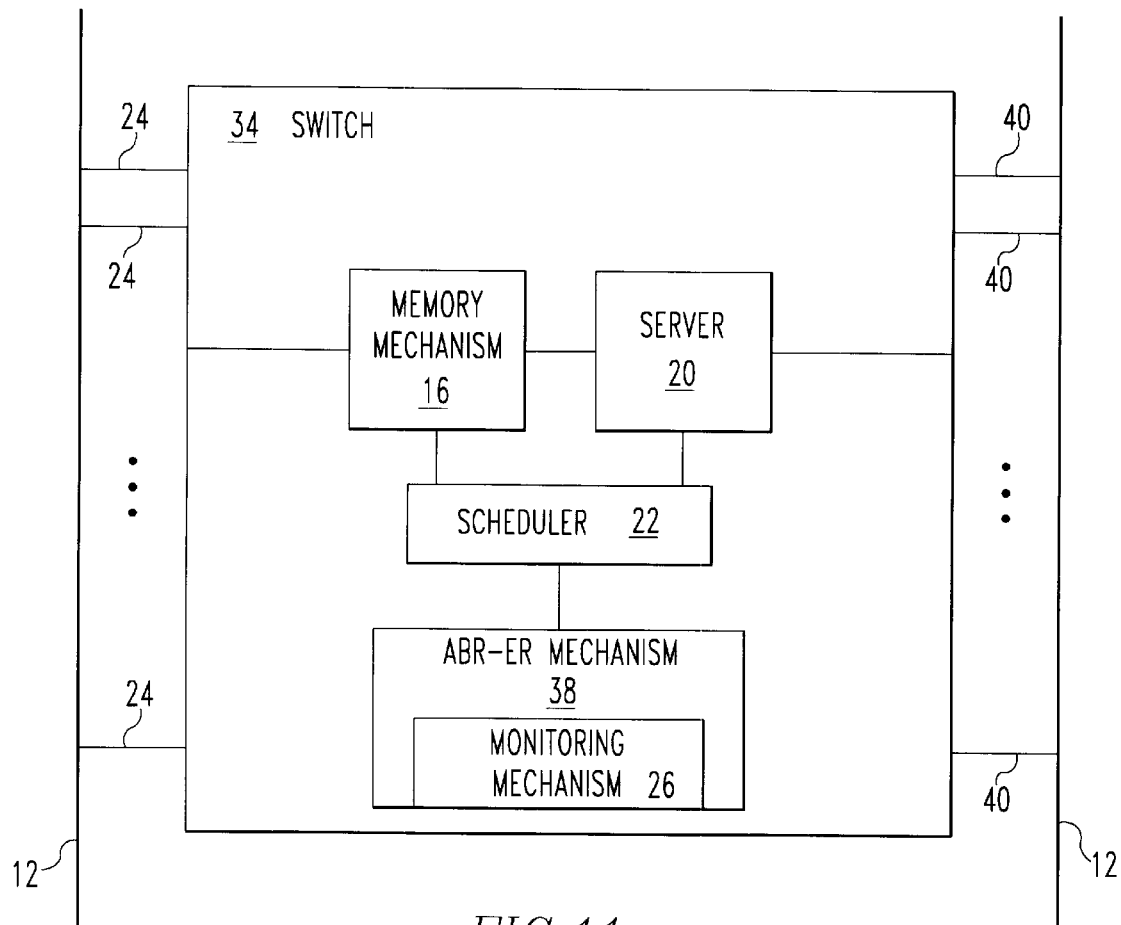
FIG. 11 is a schematic representation of a switch of the present invention.

Referring now to the drawings wherein like reference numerals refer to similar or identical parts throughout the several views, and more specifically to FIG. 9 thereof, there is shown an apparatus 10 for switching cells from entities in a network 12. The apparatus 10 comprises an input mechanism 14 for receiving all cells by the apparatus 10 from the network 12. The apparatus 10 comprises a memory mechanism 16 for storing all cells received by the input mechanism 14 that are to be stored in the apparatus 10. The memory mechanism 16 is connected to the input port mechanism. The memory mechanism 16 has an occupancy for cells. The apparatus 10 comprises an output mechanism 18 for sending cells from the apparatus 10 to the network 12. The apparatus 10 comprises a server 20 for providing service to the cells at a service rate. The server 20 is connected to the memory mechanism 16 and the output mechanism 18. The apparatus 10 comprises a scheduler 22 for providing service to the cells as a function of the memory mechanism's occupancy by the cells. The scheduler 22 is connected to the server 20 and the memory mechanism 16.

Preferably, the input mechanism 14 includes J input port mechanisms 24, where J is greater than or equal to 2 and is an integer. All the input port mechanisms 24 together preferably receive cells at an arrival rate and wherein the scheduler 22 includes a mechanism 26 for monitoring the occupancy of the memory mechanism 16, and a mechanism 28 for changing the arrival rate at which cells are received by all input port mechanisms 24.

Preferably, the monitoring mechanism 26 determines additional bandwidth available to the entities based on the difference between the arrival rate of cells to the memory mechanism 16 and the service rate available to the cells in the memory mechanism 16 from the server 20. Each entity preferably has a minimum cell rate, and the changing mechanism 28 computes the fair share of the additional bandwidth to be allocated to each of the entities requesting service.

Preferably, each of the input port mechanisms 24 has an entity, arrival rate of cells corresponding to an entity, and the changing mechanism 28 changes the entity arrival rate of each of the entities providing cells through an input port mechanism so the arrival rate of cells from all input port mechanisms 24 is equal to the service rate available to the cells in the memory mechanism 16 from the server 20, said arrival rate the sum of all entity arrival rates. The changing mechanism 28 preferably changes the entity arrival rate of each of the entities providing cells through an input port mechanism by an equal amount.

Preferably, the memory mechanism 16 is comprised of either a shared memory mechanism 30 in which all cells received by the apparatus 10 are stored, or separate buffers 32, with each input port mechanism having an associated buffer which stores all the cells received only by the associated input port mechanism or separate buffers 32 for each entity. The monitoring mechanism 26 preferably monitors the number of entities which has a backlog of cells in the memory mechanisms 16 waiting for service from the server 20.

Preferably, the entities include ABR VCs. The entities preferably include CBR/VBR Vcs. Preferably, the monitoring mechanism 26 monitors the number of ABR VCs which have a backlog of cells waiting for service from the server 20, the number of CBR/VBR cells ($n_{vbr}$) from CBR/VBR VCs served.

In the operation of the preferred embodiment, consider a switch 34 output port mechanism 40. Let $N_{60}$ denote the set of active ABR VCs passing through the port. An ABR VC is active if its source sends cells at some non-zero rate. The set $N_\alpha$ can be partitioned into two sets, $N_\alpha = N_{bs} \cup N_{be}$, where $N_{bs}$ is the set of active ABR VCs bottle-necked at the switch 34 port and $N_{be}$ is the set of active ABR VCs bottle-necked elsewhere. Let $N_\alpha$, $N_{bs}$ and $N_{be}$ be the number of ABR VCs in the sets $N_\alpha$, $N_{bs}$ and $N_{be}$, respectively. Let $C_{abr}$ denote the amount of available bandwidth.

If $N_{be} = \emptyset$, then the fair share (FS) is equal to $$FS = \frac{C_{abr} - \sum_{i \in N_a} MCR_i}{N_a} \quad (1)$$

where $MCR_i$ is the minimum cell rate (MCR) of ith ABR VC. The explicit rate (ER) of the ith VC is then $FS+MCR_i$.

If $N_{be} \neq \emptyset$, then the above value of FS may result in the under-utilization of the link bandwidth because the ABR VCs in $N_{be}$ may not be able to use the allotted FS. The bandwidth unused by the ABR VCs in $N_{be}$ has to be redistributed to the ABR VCs in $N_{bs}$ to achieve 100% utilization of the link bandwidth. The redistribution of unused bandwidth is one of the non-trivial aspects of exact fair share computing ABR algorithms.

Let $B_i$ denote the maximum amount of bandwidth that the ith ABR VC can use and let L denote the link bandwidth. If the ith ABR VC is in $N_{bs}$, then set $B_i=L$. The redistribution of bandwidth should result in a FS which satisfies the following equation:

$$\sum_{i \in N_a} \min(B_i, MCR_i + FS) = C_{abr} \quad (2)$$

That is, $$\sum_{i \in N_{ba}} (MCR_i + FS) + \sum_{j \in N_{be}} B_j = C_{abr} \quad (3)$$

This implies $$FS = \frac{C_{abr} - \sum_{i \in N_a} MCR_i - \sum_{j \in N_{be}} B_j}{N_{bs}} \quad (4)$$

In order to compute FS, an exact fair-share computing switch 34 algorithm needs to keep track of $$A = -\sum_{i \in N_{ba}} MCR_i - \sum_{j \in N_{be}} B_j,$$

which is not a trivial task.

Instead of keeping track of A, it can be estimated. If A is under-estimated (over-estimated), then the net arrival rate of ABR VC cells will be less (more) than the net service rate available to ABR VCs. SERIA uses this fact to estimate A. SERIA maintains a variable called additional bandwidth parameter, U, which is added to $C_{abr}$ when computing the fair share:

$$FS = \frac{\max(C_{abr} + U, 0)}{\max(N_{bs}, 1)}. \quad (5)$$

where the max() in the denominator is performed to avoid division by zero. SERIA adjusts U until the net rate of arrival of ABR cells is equal to the net service rate available to the ABR VCs.

The notations used herein are listed in Table 1. The complete pseudo-code description of SERIA

TABLE 1

| | Notations |
|---|---|
| N | Number of slots in a measuring period. |
| $N_a$ | Set of active ABR VCs. |
| $N_{bs}$ | Set of active ABR VCs bottle-necked at the switch port. |
| $N_{be}$ | Set of active ABR VCs bottle-necked elsewhere. |
| $N_a$ | Number of active ABR VCs. |
| $N_{bs}$ | Number of active ABR VCs bottle-necked at the switch port. |
| $N^m_{bs}$ | Measured value of $N_{bs}$. |
| L | Output Link bandwidth. |
| $B_i$ | Maximum amount of bandwidth the ith ABR VC can use. |
| $n_g$ | Number of CBR/VBR cells served in the current measuring period. |
| T | per-VC queue length threshold. |
| $q_i$ | per-VC queue length of the ith VC. |
| $Q_n$ | Current ABR buffer occupancy. |
| $Q_p$ | Previous ABR buffer occupancy. |
| $\Delta Q$ | The difference $\Delta Q = Q_n - Q_p$. |
| $\alpha_u$ | Exponential averaging factor for U. |
| $\alpha_n$ | Exponential averaging factor for $N_{bs}$. |
| $C_{abr}$ | Bandwidth leftover by VBR/CBR VCs. |
| U | Additional bandwidth parameter. |
| $\gamma$ | Buffer weighting function. |
| FS | Fair Share. |
| B | Total ABR buffer capacity. |
| $\beta$ | Buffer fraction. |
| L | Output Link bandwidth in cells per second. |
| R | The ratio $R = L/N$. | is given in the Appendix.

Computing $C_{abr}$

During each measuring period of N slots, SERIA keeps track of the number of cells, $n_g$, served from bandwidth guaranteed VCs (i.e., from CBR and VBR VCs). The bandwidth leftover by the CBR and VBR VCs is then equal to:

$$C_{abr} = \frac{N - n_g}{N} L. \quad (6)$$

Computing U

As already stated, SERIA adjusts the additional bandwidth parameter, U, until the net rate of arrival of ABR cells is equal to the net service rate available to the ABR VCs. SERIA increases (decreases) U if the net arrival rate of ABR VCs is less (more) than the net service rate available to the ABR VCs. The difference in the arrival and service rates is determined by the rate at which the ABR buffer occupancy changes.

Let B be the size of the ABR buffer and let $Q_n$ and $Q_p$ denote the aggregate ABR buffer occupancy during the current and previous measurement intervals, respectively. And let $\Delta Q = Q_b - Q_p$. During each measuring interval, if $Q_n$ is small (<N) then U is set to +L, the line rate. If $Q_n$ is very large (>(B−N)), then U is set to −L. Otherwise U is updated as follows:

$$U = U - \alpha_u \gamma \Delta Q \frac{L}{N}, \quad (7)$$

where $\alpha_u$ is the exponential averaging factor, and $\gamma$ is a weighting function described below. Note that, if the ABR buffer occupancy increases (i.e., if $\Delta Q > 0$), then U is decreased. Similarly, if the ABR buffer occupancy decreases, then U is increased. The exponential averaging factor, $\alpha_u$, is used to reduce oscillation in U.

If the net load in the link is less than 100.0%, then Equation (7) will keep increasing U to a very high value in an attempt to fully utilize the link bandwidth. Such high values of U cannot be quickly reduced when the net load later increases. Hence the algorithm will suffer high inertia and cannot respond quickly to rapidly changing network 12 load conditions. To prevent such large increases of U, U has to be upper bounded. On the other hand, if the net arrival rate of ABR cells is more than the net service rate available to the ABR VCs, then Equation (7) will reduce U in order to encourage the ABR sources to reduce their cell rates. If the round trip delay is large, then source's reaction is delayed. During this interval, U will be reduced to a very negative value. Such low values cannot be quickly changed to positive values when later bandwidth becomes available. Therefore, it is advantageous to lower bound U as well. Since the range of $C_{abr}$ is [0,L] and the required range of FS is also [0,L], the necessary and sufficient range for U is [−L,+L].

Computing $N_{bs}$

The active ABR VCs in $N_{be}$ do not build any appreciable per-VC queue length at the switch 34 port. Hence, a good estimate of $N_{bs}$ is the set of ABR VCs for which the per-VC queue length exceeds some low threshold, T. A suitable values for T range from 3 to 10 cells. Let $N^n{}_{bs}$ and $N_{bs}$ denote the measured value and the exponentially averaged value, respectively. $N^n{}_{bs}$ is measured as follows: At port initialization both $N^n{}_{bs}$ and $N_{bs}$ are set to zero. Whenever a cell arrives to an ABR VC and causes its per-VC queue length to increase from T−1 to T, $N^n{}_{bs}$ is incremented. Whenever a cell departs causing the per-VC queue length to decrease from T to T−1, $N^n{}_{bs}$ is decremented. And $$N_{bs} = (1 - \alpha_n) N_{bs} + \alpha_n N^{nbs}, \quad (8)$$

where $\alpha_n$ is the exponential averaging parameter.

ΔQ Weighting Function

If an ABR switch 34 algorithm adjusts FS based only on ΔQ without regard to the value of $Q_n$, then $Q_n$ can slowly drift to high values resulting in high cell losses. The earlier ABR switch 34 algorithms prevented such drifts by partitioning the ABR buffer into several regions using thresholds and reducing the computed FS progressively as $Q_n$ exceeds these thresholds.

SERIA uses a simpler approach whereby ΔQ is weighted by γ, a function of $Q_n$ (and ΔQ). An example of a suitable weighting function is:

$\gamma = Q_n / \beta B$ if (ΔQ<0), $\gamma = \max(1 - \gamma, 0)$, where B is the total buffer space available for the ABR VCs and β is a parameter which is currently set to 0.8.

Suppose that the ABR buffer occupancy is increasing (i.e., ΔQ>0), then U will be decreased. The weighting ensures that U will be decreased more if the ABR buffer occupancy is early full than if the ABR buffer occupancy is nearly empty. Similarly if the ABR buffer occupancy is decreasing (i.e., ΔQ<0), then U will be increased. The weighting ensures that U will be increased more if the ABR buffer occupancy is nearly empty than if it is nearly full.

The ΔQ weighting encourages $Q_n$ to be around βB/2, which ensures that enough cells belonging to ABR VCs are available in the ABR buffer to fill free slots. Moreover, simulation results show that the ΔQ weighting leads to greater stability of $Q_n$ than the method adopted in the previous switch 34 algorithms.

Figure 1:
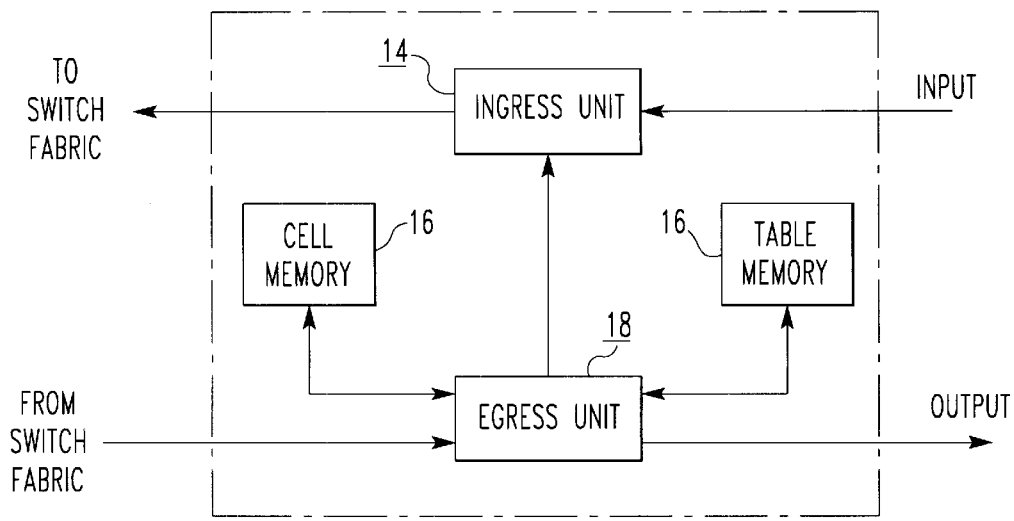
FIG. 1 is a schematic representation of an ATM switch port organization.

FIG. 1 shows a simplified ATM switch 34 port organization. The egress unit performs FS calculation, cell buffer management, scheduling, policing and other functions. The computed FS is sent to the ingress unit which stamps the ER value in the backward RM cell. The cells are stored in the cell memory and per-VC information is stored in the table memory. SERIA is much simpler to incorporate in high-speed ATM switches than the earlier proposed exact fair share computing algorithms for the following reasons:

SERIA need not perform any memory accesses for computing FS. The few variables used by SERIA can be kept in registers within the egress unit. On the other hand, switch 34 algorithms which uses per-VC flags or per-VC variables need to perform O(n) table memory accesses per slot.

Secondly, there is no need to perform a VCI/VPI lookup when backward RM cells arrive. Since the computed FS is common to all ABR VCs and since the RM cells contains its MCR there is no need to lookup VCI/VPI to access VC specific information.

Thirdly, SERIA does not make any specific requirements regarding buffer management nor service scheduling and hence SERIA can work with a variety of scheduling and buffer management schemes.

Fairness

The available bandwidth can be distributed using a number of fairness criteria. Under the MCR plus equal share fairness criterion, the available bandwidth is divided equally among the active ABR VCs. Under the proportional to MCR criterion, the available bandwidth is divided proportionally to the MCR. The main drawback of the proportional to MCR criterion is that ABR VCs with zero MCR gets zero additional bandwidth. For this reason, most ABR algorithms are designed to provide MCR plus equal share fairness. The pseudo-code given in Appendix shows SERIA providing MCR plus equal share fairness. It can easily be modified to provide other fairness criteria listed in [ATM Forum. Traffic management specification version 4.0, April 1996, incorporated by reference herein].

The max-min fairness definition [D. Bertsekas and R. Gallager. *Data Networks, Second Edition*. Printice Hall, Inc., 1992] was extended to include MCR in [N. Yin. Fairness definition in ABR service model. ATM Forum Document: AF-TM 94-0928R2, November 1994]. The definition of extended max-min fairness criterion can be stated as follows: Let FS be the unique solution to Equation (2). The extended max-min fairness criterion is satisfied, if, for each $i \in N_a$, the ith ABR VC is allocated a bandwidth of min($B_i$, $MCR_i$+FS). SERIA satisfies the extended max-min fairness criterion.

Robust Performance when Bursty VBR VCs are Present

The real test of an ABR switch 34 algorithm is its performance in the presence of highly bursty VBR streams. That is, not only should the ABR VCs use the unallocated bandwidth, they must be able to use the bandwidth temporarily unused by the CBR and VBR VCs. As noted in [F. M. Chiussi and Y. T. Wang. An ABR rate-based congestion control algorithm for ATM switches with per-VC queueing. In *GLOBECOM '97*, pages 771–778, 1997] most ABR algorithms do not perform well in such scenarios. One of the strengths of SERIA is that it performs very well even with highly bursty VBR streams.

Robust Performance when Largenumber of ABR VCs are Present

The approximate fair share computing algorithms, which do not keep track of $N_a$ or $N_{bs}$, suffer large oscillations when the number of ABR VCs is large. When such an algorithm detects free bandwidth, it increases the FS of each ABR VC which causes a large increase in the arrival rate. This forces the algorithm to sharply decrease its FS which reduces the cell rate of each ABR VC. This leads to oscillations and long transient periods. This problem is avoided in the exact fair share computing algorithms. Simulation results show SERIA's robust performance when there are large number of ABR VCs present.

Robust Performance in the Parking Lot-Like Topology

It is important that switch 34 algorithm do not discriminate ABR VCs with larger number of hops in favor of those with smaller number of hops. Early switch 34 algorithms suffered this problem which is referred to in the literature as the "beat-down problem" [F. Bonomi and K. Fendick. The rate-based flow control framework for the available bit rate ATM service. *IEEE Networks*, 9(2):25–39, March/April 1995]. Simulation results show that SERIA does not discriminate ABR VCs with large number of hops.

Simulation Results

All links are OC-3 links (155.52 Mbits/sec) and the switches use SERIA with an ABR buffer size of 8K cells. The switches use per-VC queueing and a simple weighted round robin (WRR) scheduler 22. The weights in the WRR scheduler 22 are set proportional to MCR in the case of ABR VCs and PCR in the case of VBR VCs. The measuring interval, N, is set to 64. The per-VC queue threshold, T, is set to 5 cells. The exponential averaging parameters, $\alpha_n$ and $\alpha_u$ are both set to ⅛.

The broadband terminal equipments (BTE) use the end system algorithm defined in [ATM Forum. Traffic management specification version 4.0, April 1996, incorporated by reference herein]. The parameter values of the BTE algorithm are shown in Table 2. These values are the same as the default values recommended in [ATM Forum. Traffic management specification version 4.0, April 1996, incorporated by reference herein].

The VBR sources generate ON/OFF streams with a 50 ms ON and OFF periods. During the ON period, the source transmits cells at the indicated peak cell rate (PCR) and during the OFF period, the source is idle.

Most of the ABR VCs used in the simulation experiments are persistent. That is, they always have enough cells to send at a rate equal to the allowed cell rate (ACR) indicated by the network.

TABLE 2

Parameters used in the End System Algorithm

| | |
|---|---|
| RIF | 1/16 |
| Nrm | 32 cells |
| Mrm | 2 |
| RDF | 1/16 |
| CRM | 32 cells |
| ADTF | 500 sec |
| Trm | 100 sec |
| CDF | 1/16 |
| TCR | 10 cells/sec |

Setup

Figure 2:
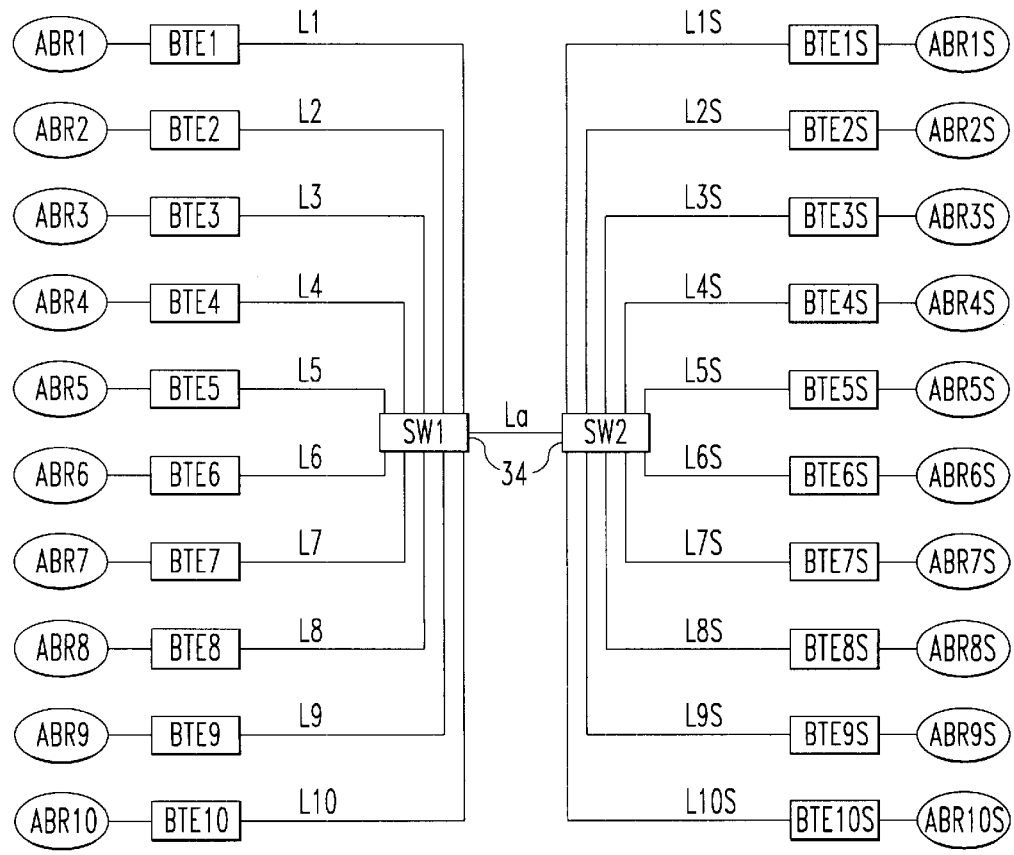
FIG. 2 shows the topology of Experiment 1.
Figure 3A:
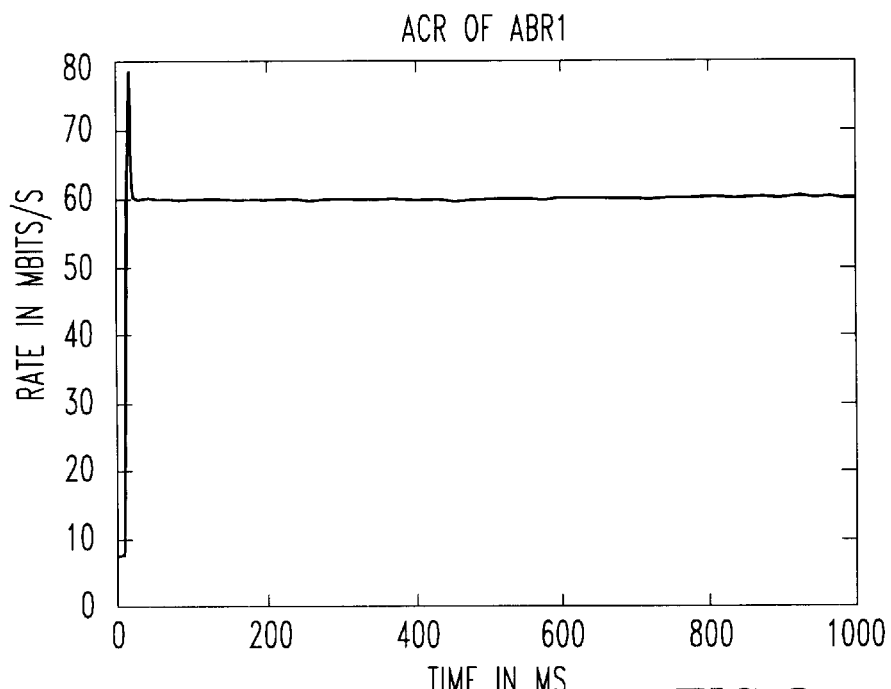
FIGS. 3a–3j show the results of Experiment 1.
Figure 3B:
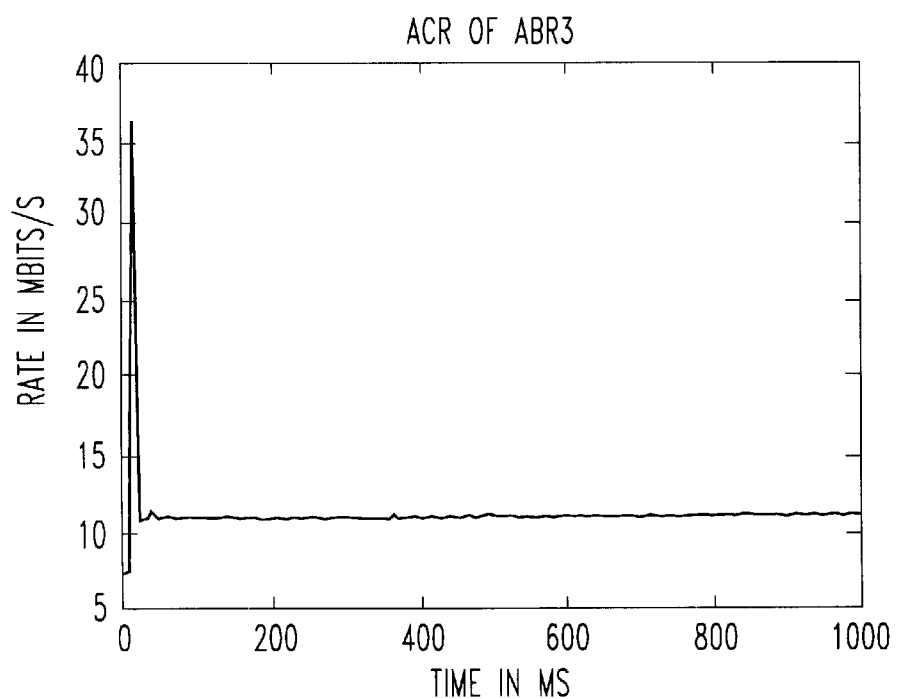
Figure 3C:
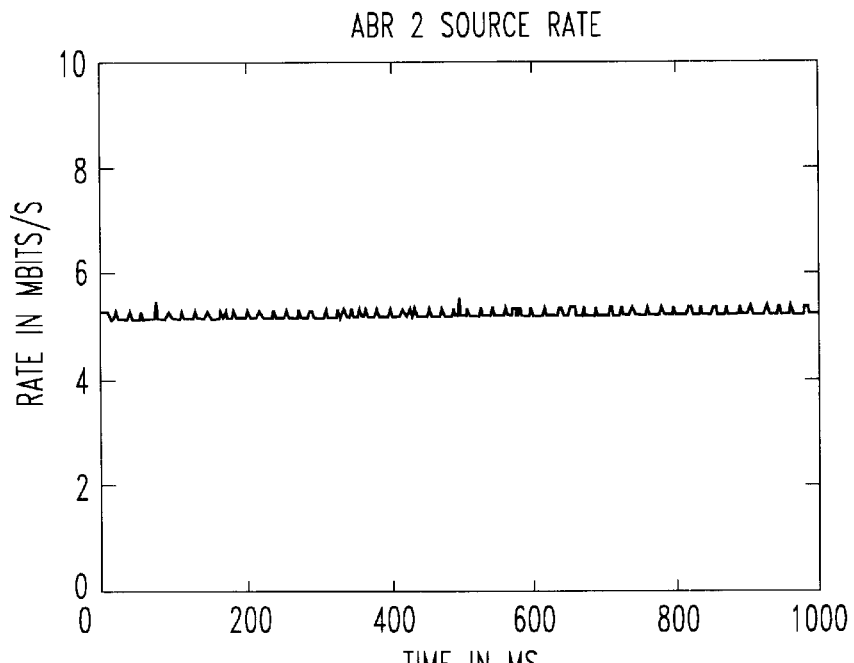
Figure 3D:
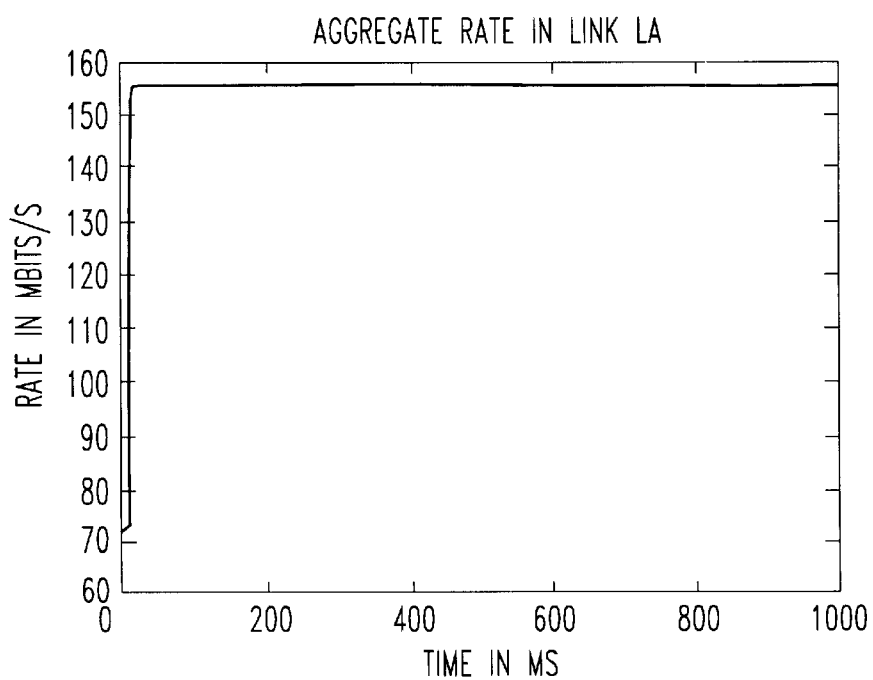
Figure 3E:
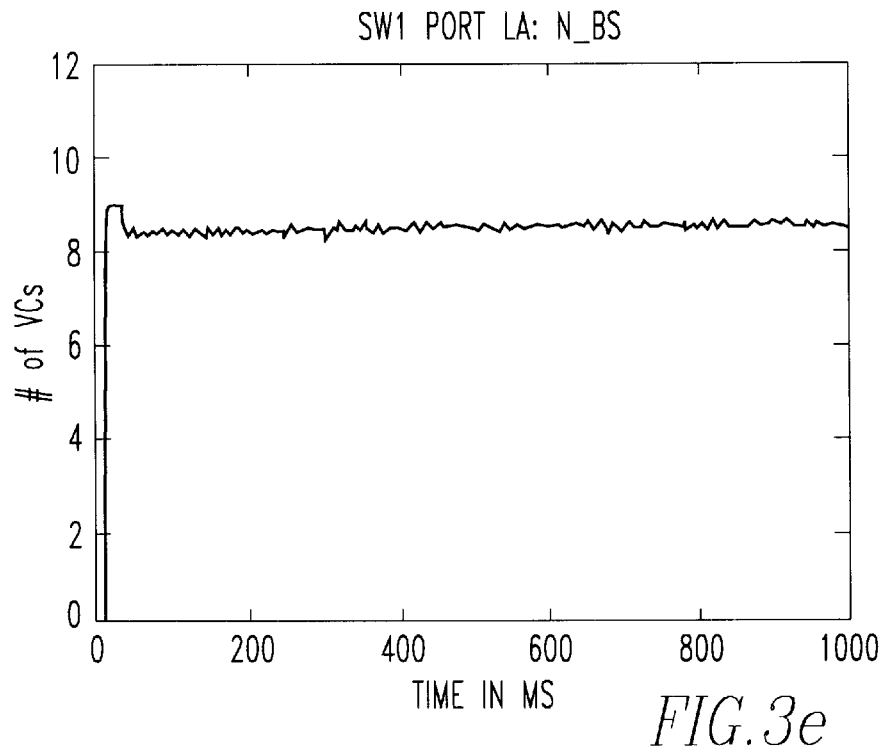
Figure 3F:
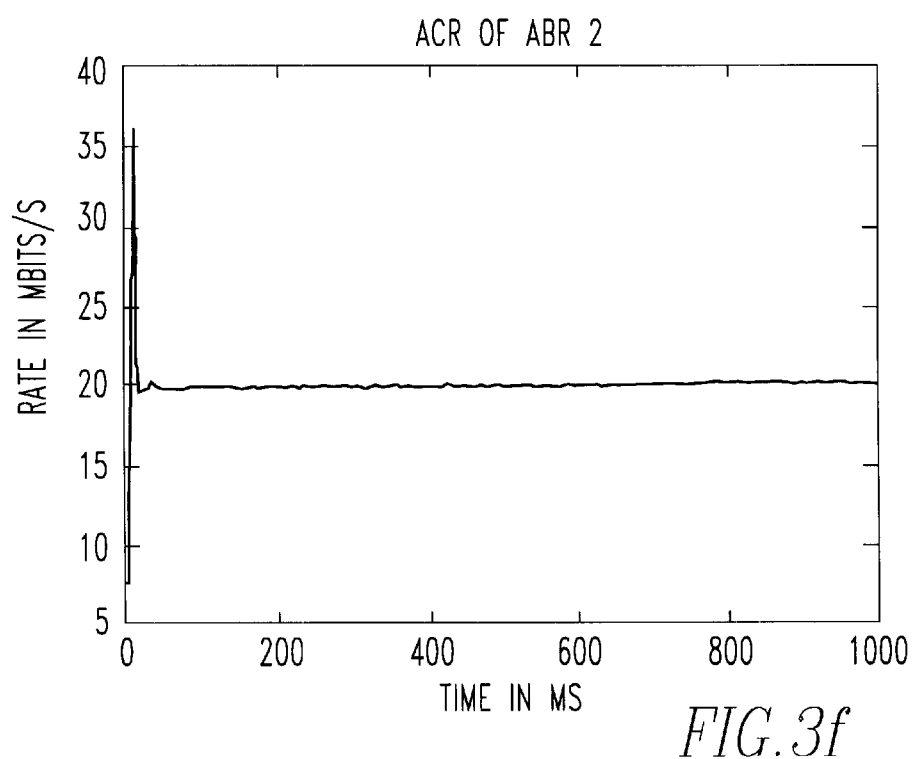
Figure 3G:
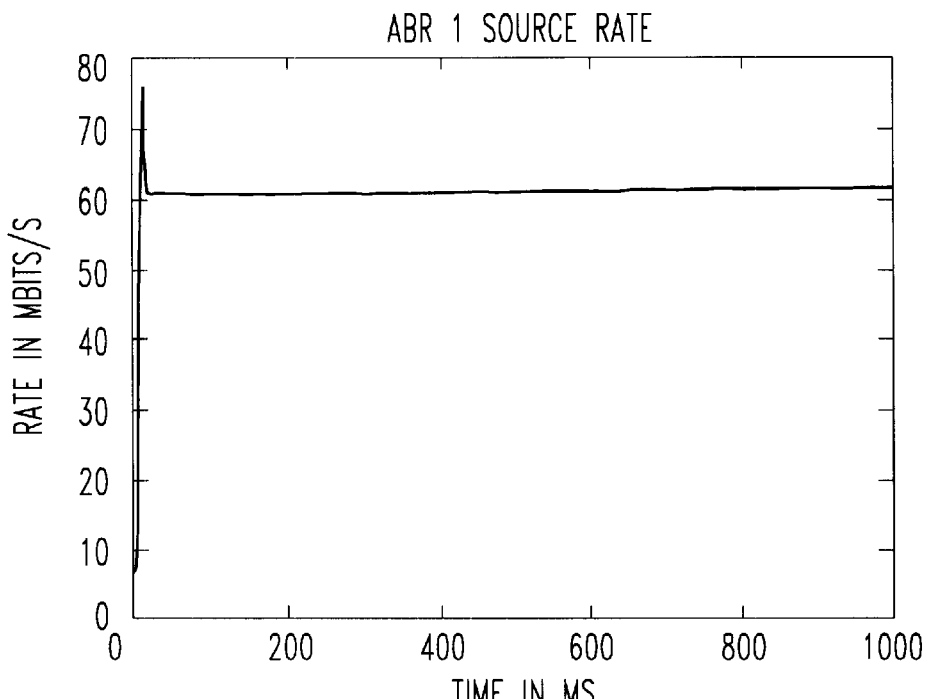
Figure 3H:
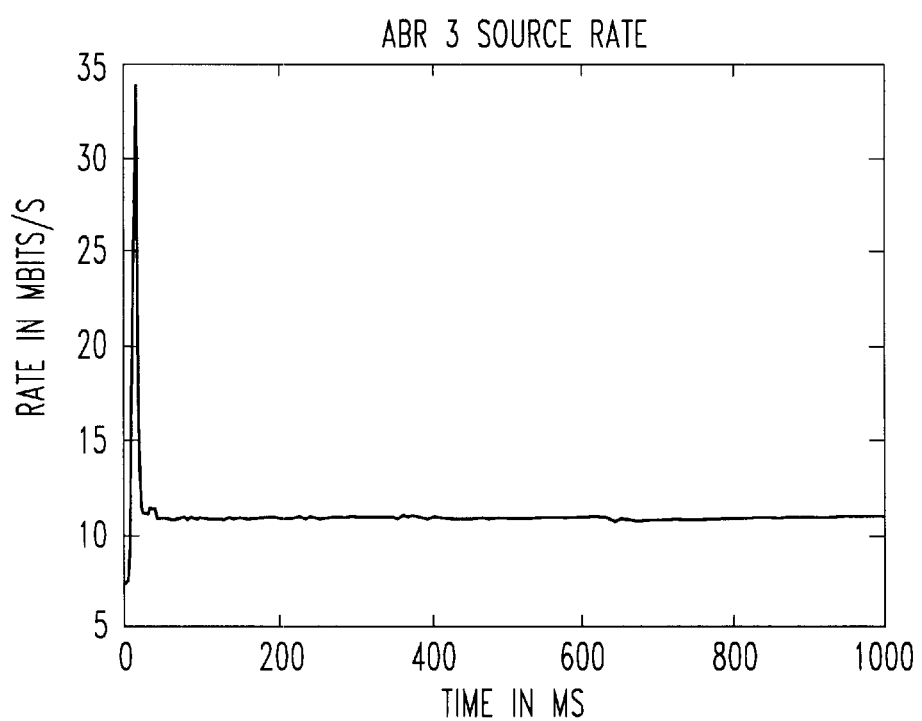
Figure 3I:
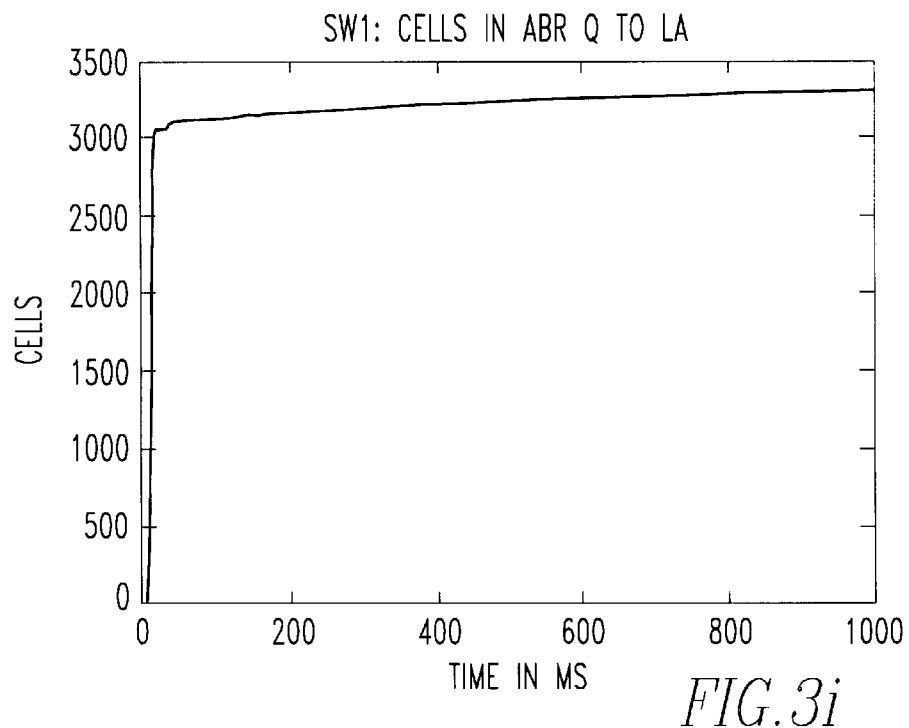
Figure 3J:
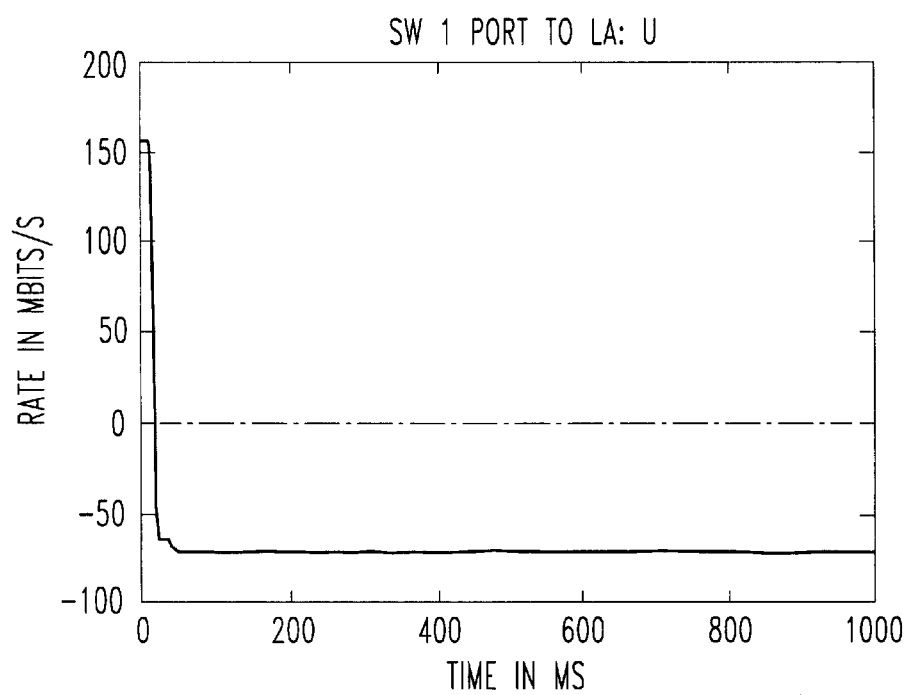
Figure 4:
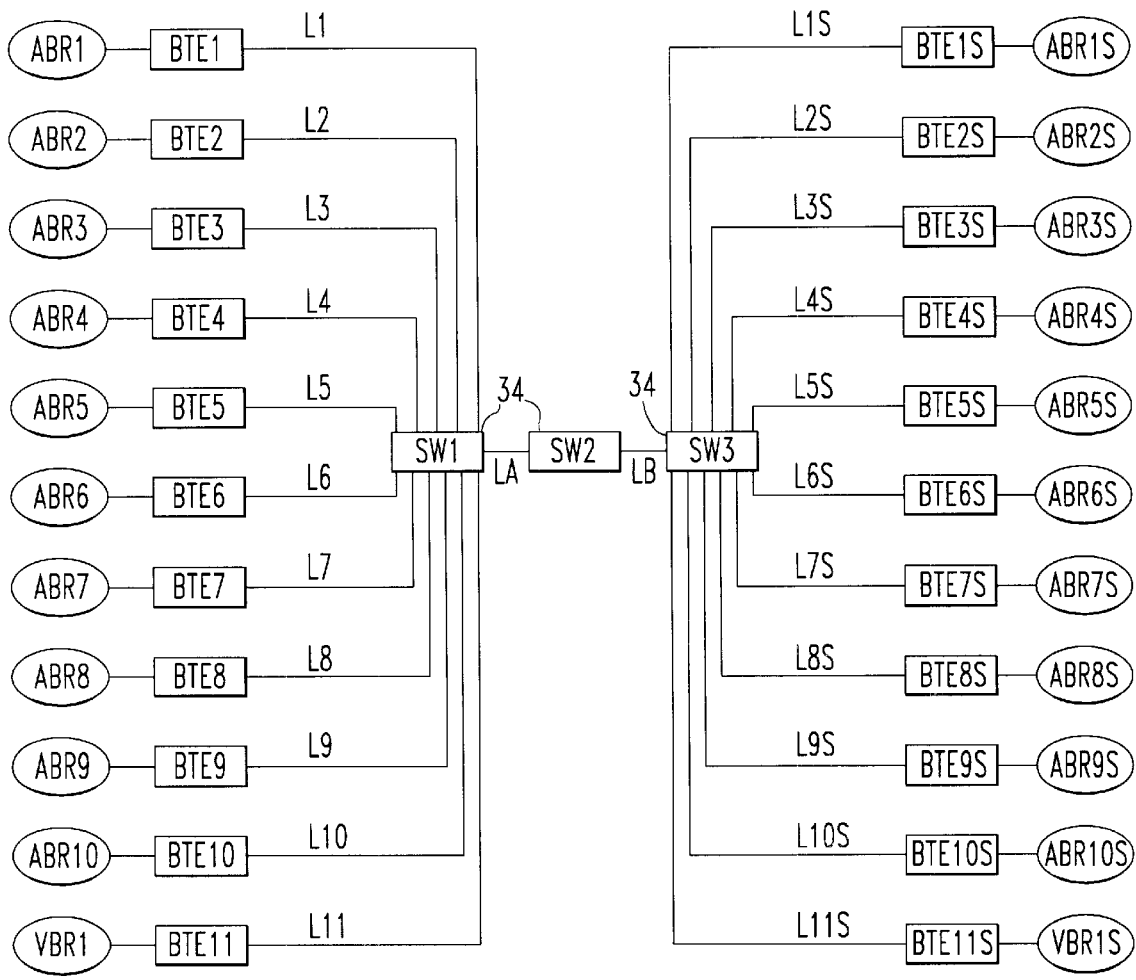
FIG. 4 shows the topology of Experiment 2.
Figure 5A:
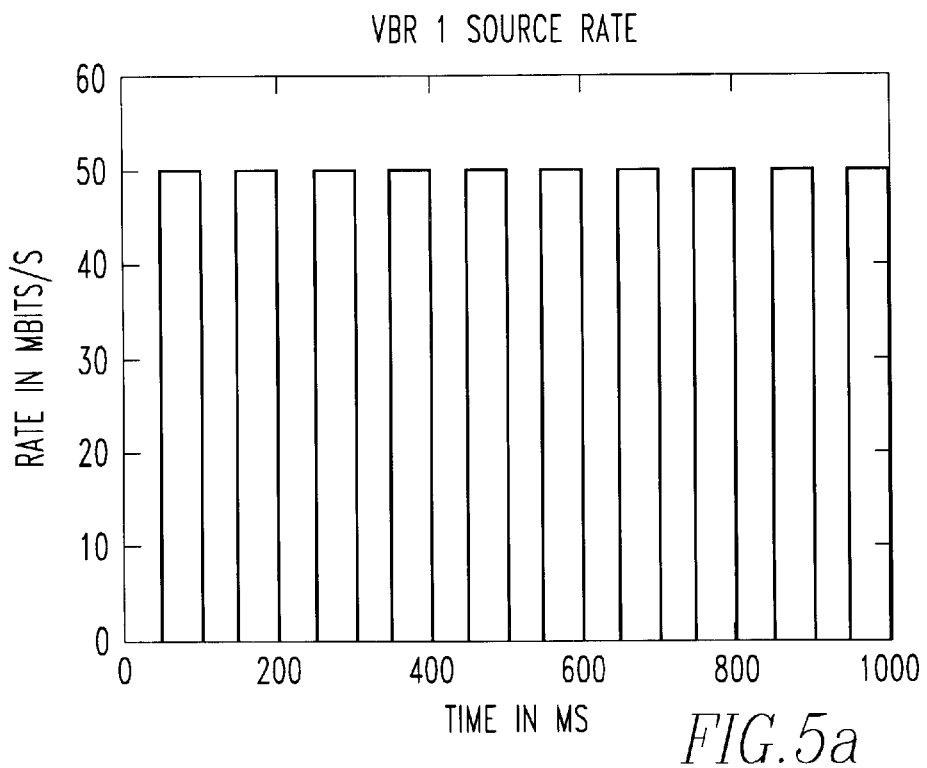
FIGS. 5a–5h show the results of Experiment 2.
Figure 5B:
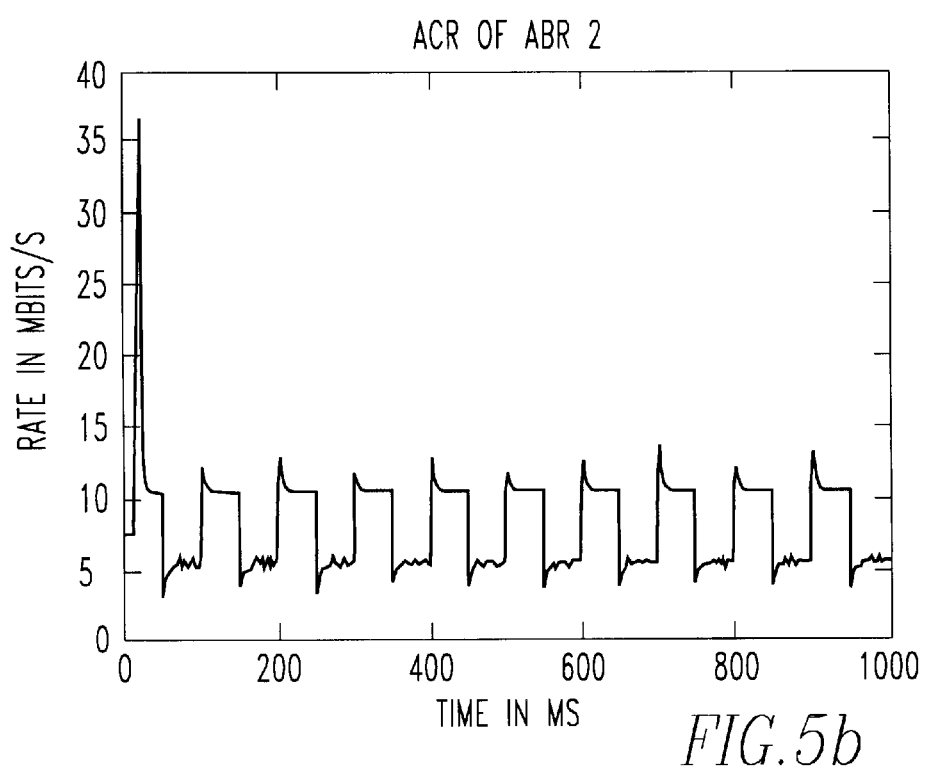
Figure 5C:
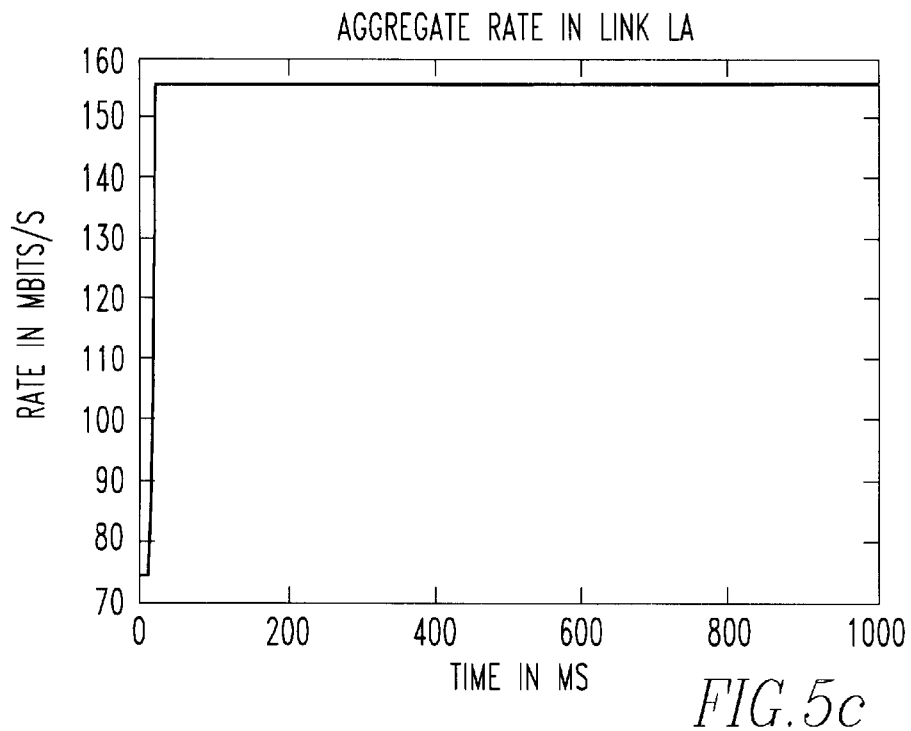
Figure 5D:
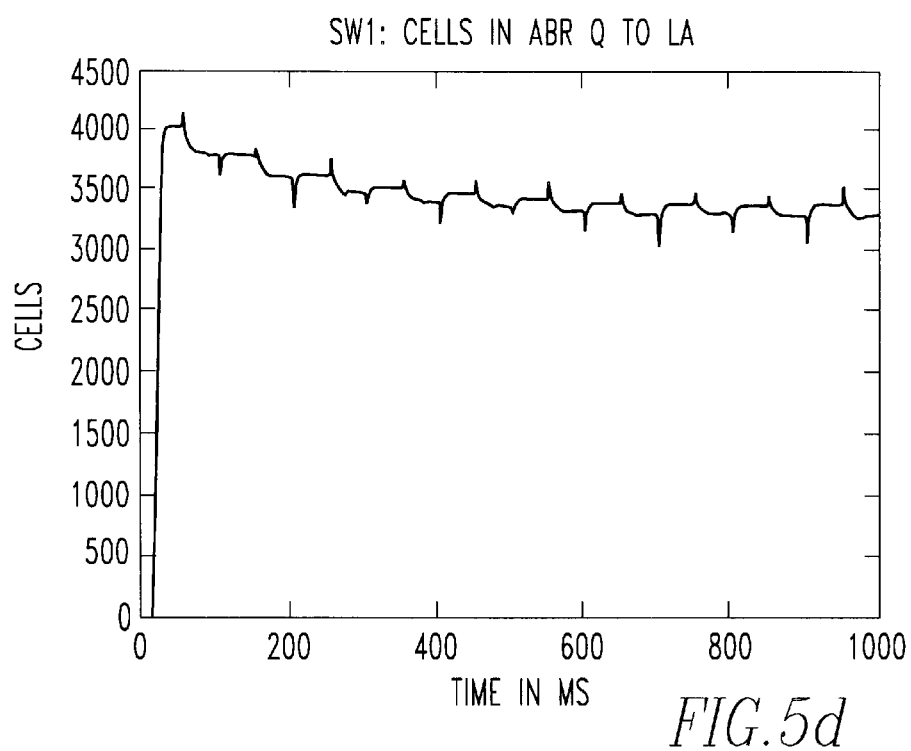
Figure 5E:
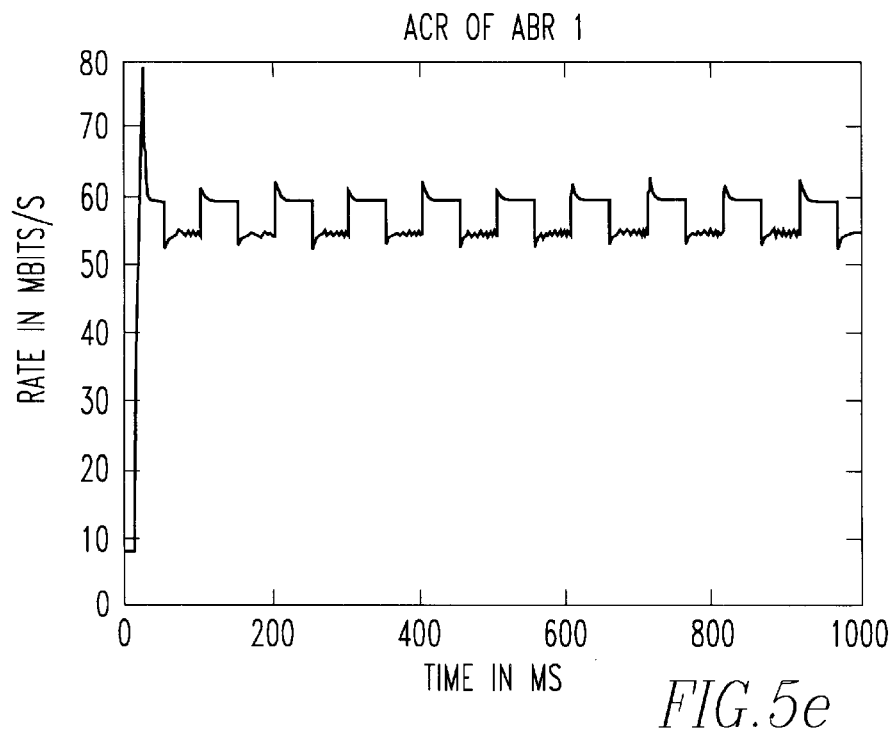
Figure 5F:
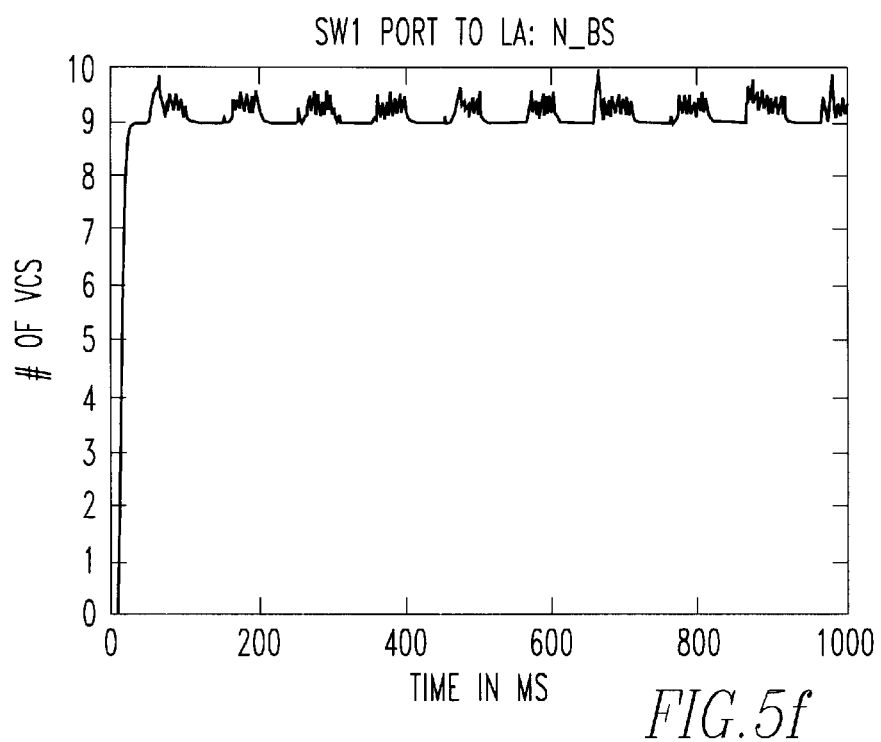
Figure 5G:
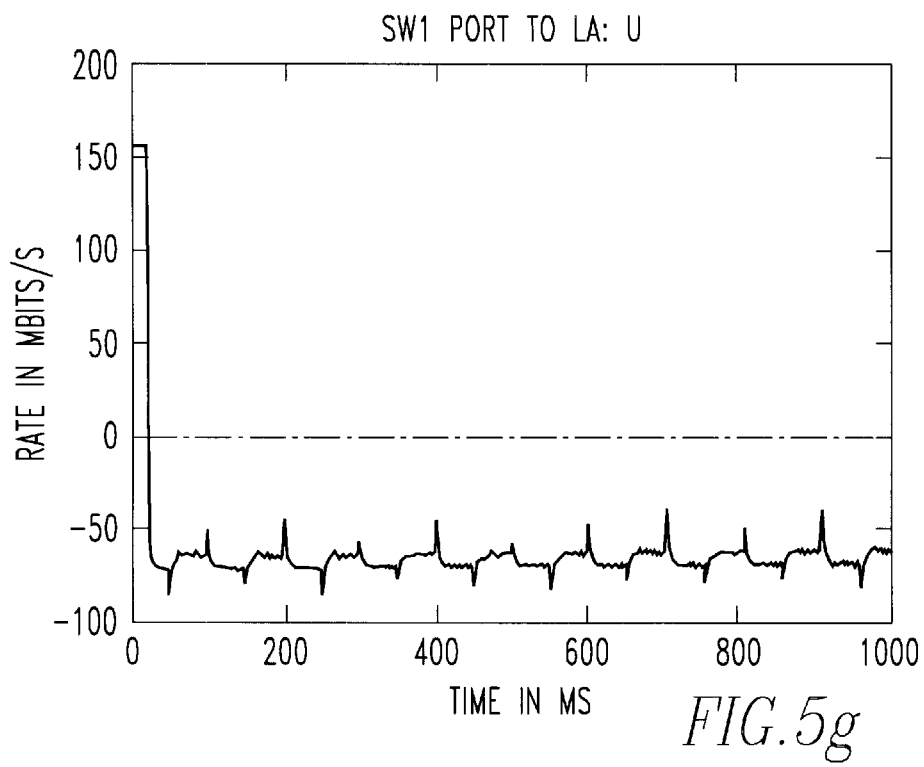
Figure 5H:
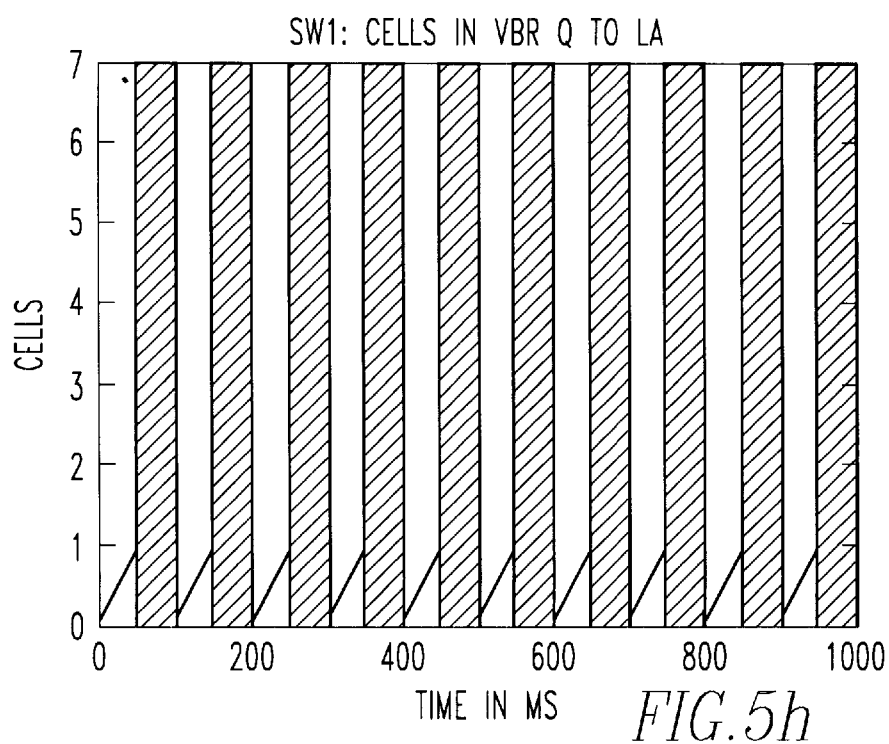
Figure 6A:
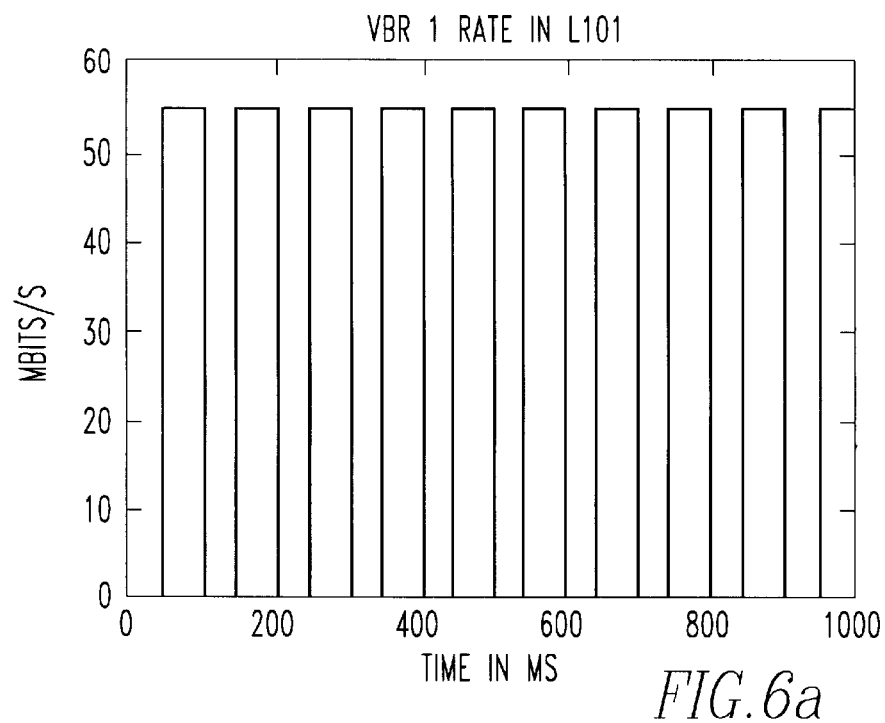
FIGS. 6a–6h show the results of Experiment 3.
Figure 6B:
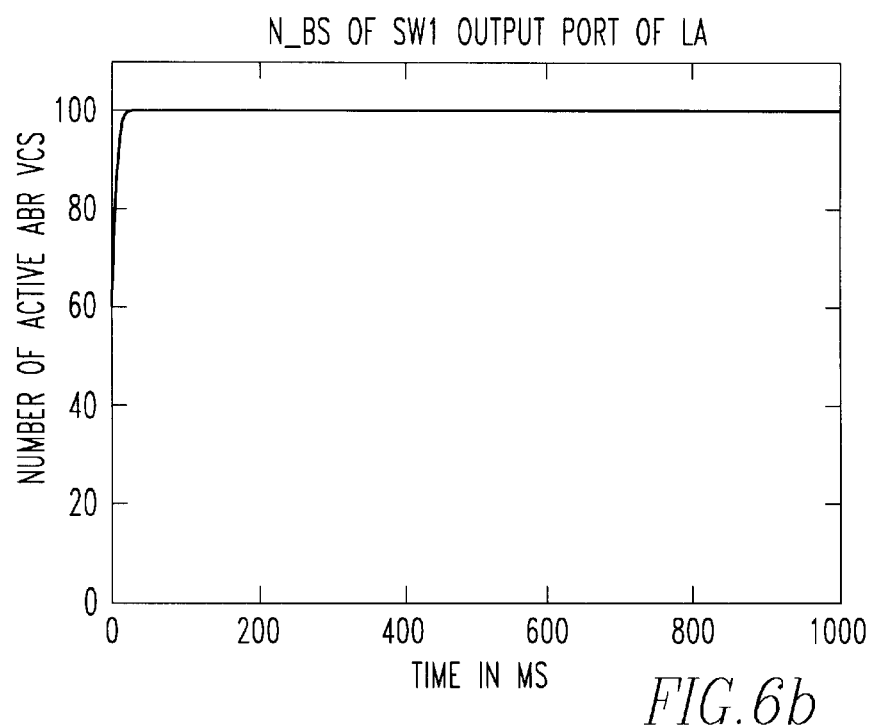
Figure 6C:
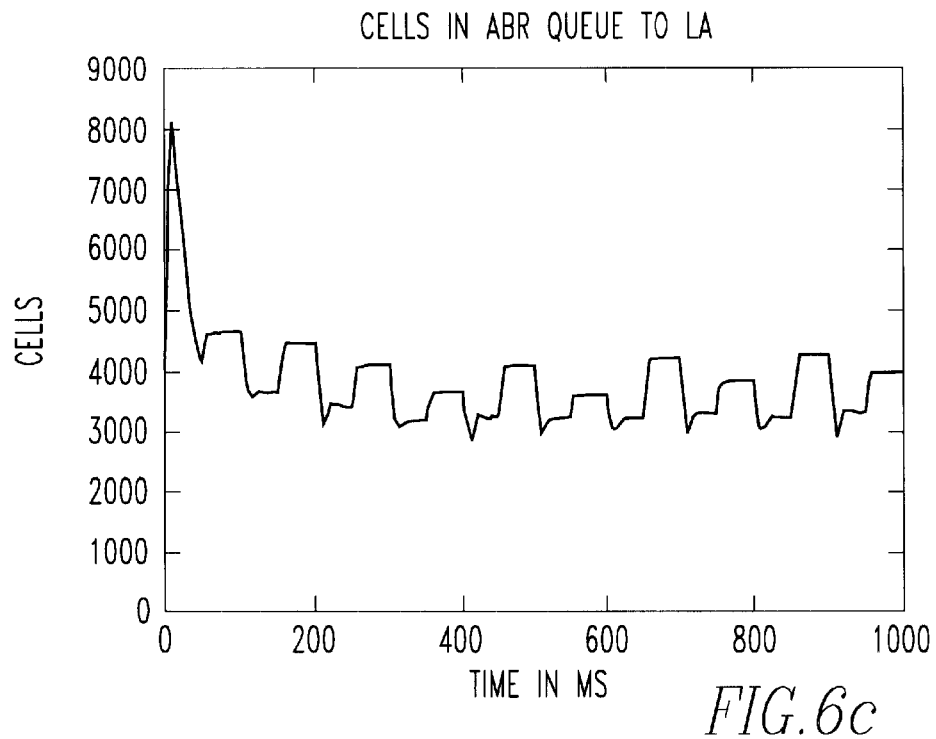
Figure 6D:
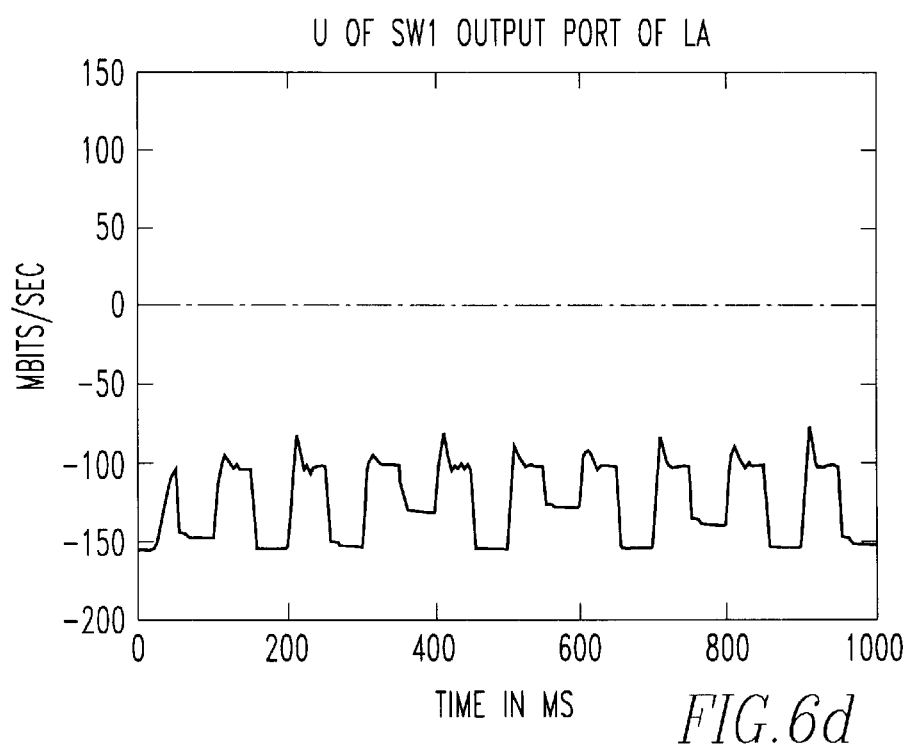
Figure 6E:
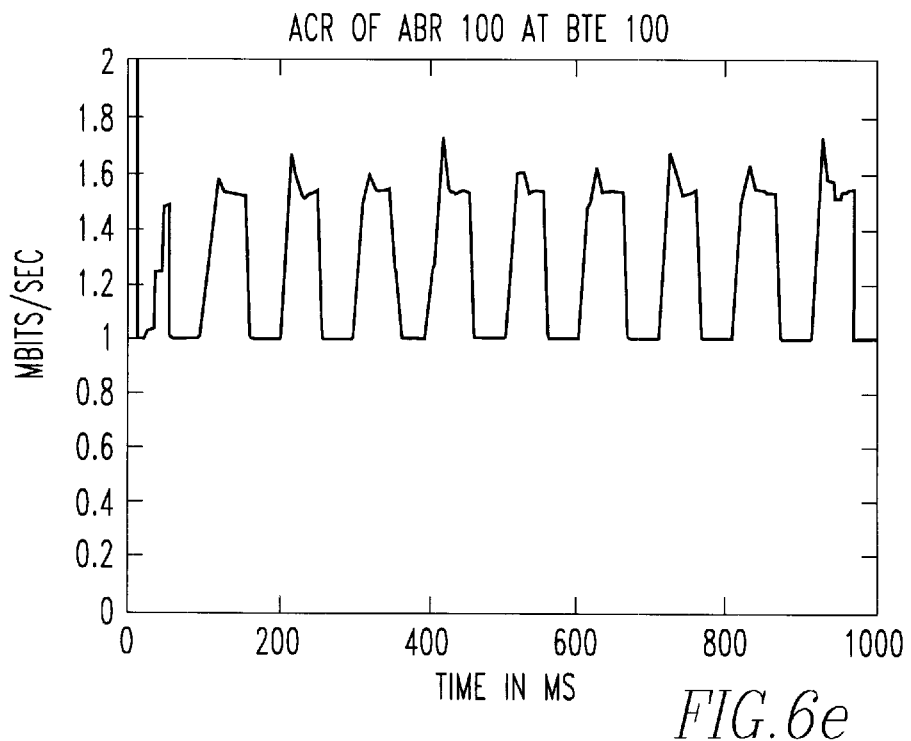
Figure 6F:
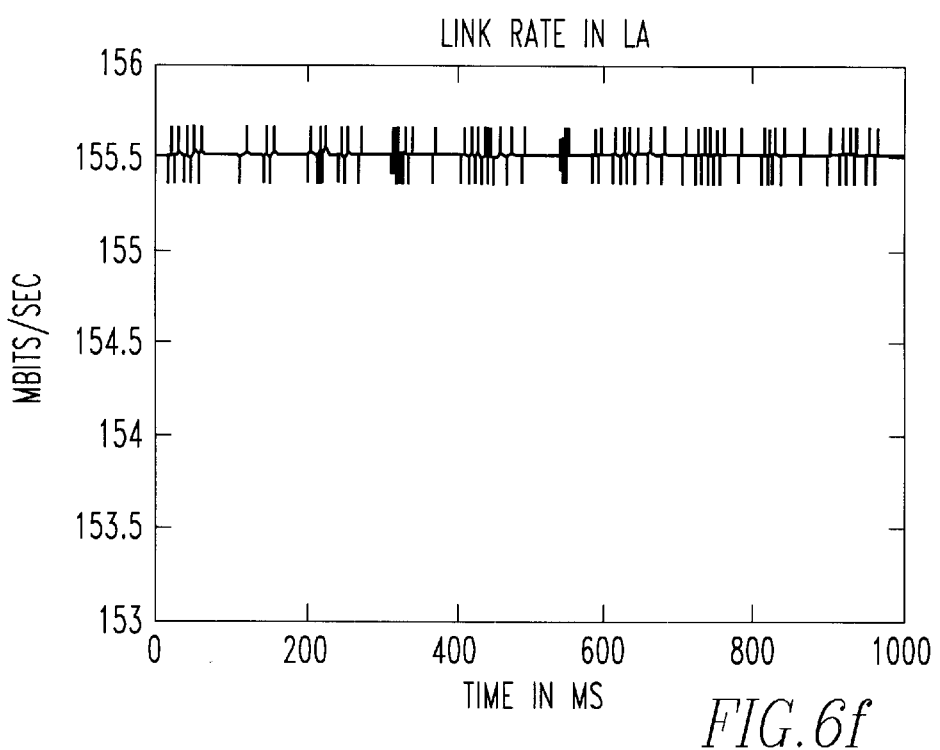
Figure 6G:
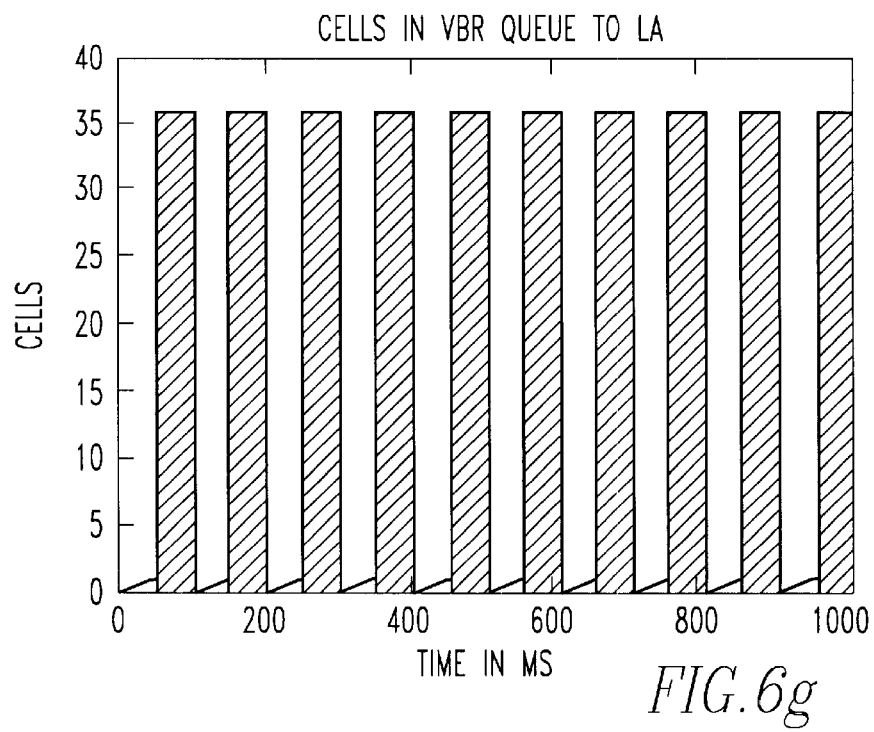
Figure 6H:
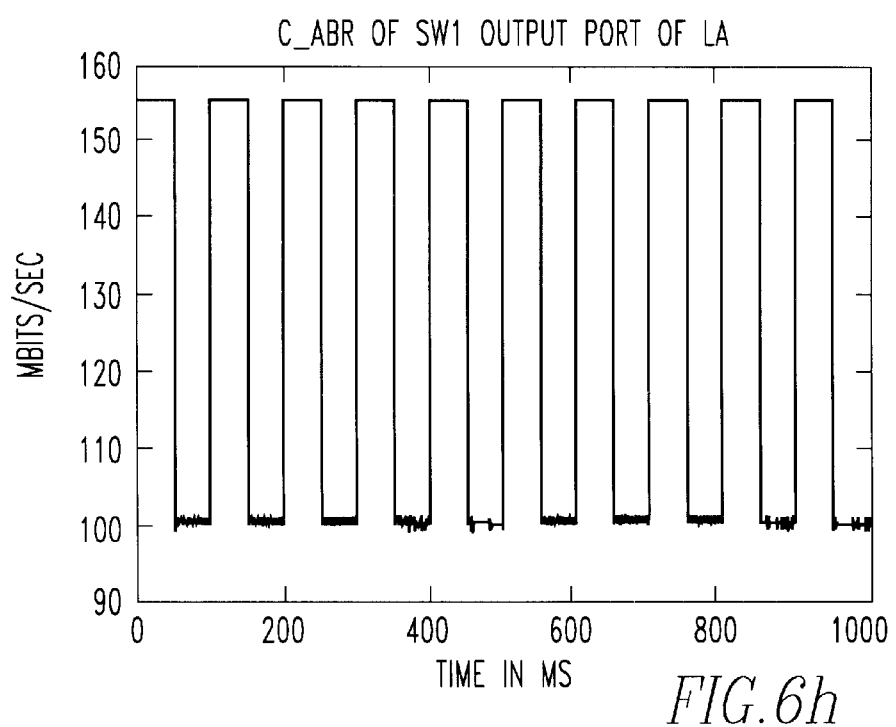

FIG. 2 shows the topology used. The setup consists of 10 ABR sources. The MCR of ABR1 and ABR2 are 50 and 10 Mbits/sec whereas the MCR of ABR3–ABR10 is 1 Mbits/sec. All ABR VCs are persistent except ABR2 which is bottle-necked at the source to 5 Mbits/sec. The links L1–L10 and L1s–L10s are 100 km long while the link La is 1000 km long.

Observations

The results of Experiment 1 are shown in FIGS. 3a–3j. The plots of ACR values indicated by the network 12 to the source in the returning RM cells, the actual ABR source rates and those of the parameters of the bottle-neck switch sw1 are shown. Substituting in Equation (2) and solving for FS, results in:

$$(50+FS)+5+8(1+FS)=155.52 \rightarrow FS=10.28 \text{ Mbits/sec} \quad (9)$$

Therefore, ABR1 should get a bandwidth of 60.28 Mbits/sec. ABR2 will use only 5 Mbits/sec. ABR3–ABR10 each gets 11.28 Mbits/sec. The simulation results agree with these values. Note that the iniial overshoots in ACR is to fill the ABR buffer to the stable point.

Experiment 2: 10 ABR VCs and a Bursty VBR VC in Simple Topology

Setup

The topology used is shown in FIGS. 5a–5h. The setup consists of 10 ABR VCs and a bursty VBR source. All ABR VCs are persistent. The MCR of ABR1 is 50 Mbits/sec and those of the other ABR VCs are 1 Mbits/sec. The PCR of VBR1 is 50 Mbits/sec. The links L1–L11 and L1s–L11s are 10 km long whereas the links La and Lb are each 1000 km.

Observations

The results of Experiment 2 are shown in FIG. 5. The ACRs are pulse shaped with the pulse occurring when the VBR source is off. When VBR is ON, $C_{abr}$=L−VBR rate}−ΣMCR=155.52−50−(50+9×1)=46.52 Mbits/sec. So each ABR VC gets 46.52/10=4.65 Mbits/sec in addition to their MCR. When VBR is OFF, $C_{abr}$=155.52−0−(50+9×10)=96.52 Mbits/sec. Hence each ABR VC gets 96.52/10=9.65 Mbits/sec in addition to their MCRs.

Experiment 3: 100 ABR VCs and a Bursty VBR VC in Simple Topology

Setup

The topology used is similar to that of FIG. 2 but with 100 identical ABR sources and a bursty VBR source. All the ABR VCs are persistent and their MCR=1.0 Mbits/sec. The PCR of VBR1 is 55 Mbits/sec. The links L1–L101 and L1$s$–L101$s$ are 10 km long whereas the link La is 1000 km long.

The results of Experiment 3 are shown in FIGS. 6$a$–6$h$. The ACRs are pulse shaped with the pulse occurring when the VBR source is off. When VBR1 is ON, $C_{abr}$=155−55−(100×1)=0 Mbits/sec. So each ABR VC only gets its MCR=1.0 Mbits/sec. When VBR1 is OFF, $C_{abr}$=155−0−(100×1)=55 Mbits/sec. Hence each ABR VC gets 55/100=0.55 Mbits/sec in addition to their MCRs. That is, they each get 1.55 Mbits/sec.

Experiment 4: 5 ABR VCs and a Bursty VBR VC in Parking Lot Topology

Figure 7:
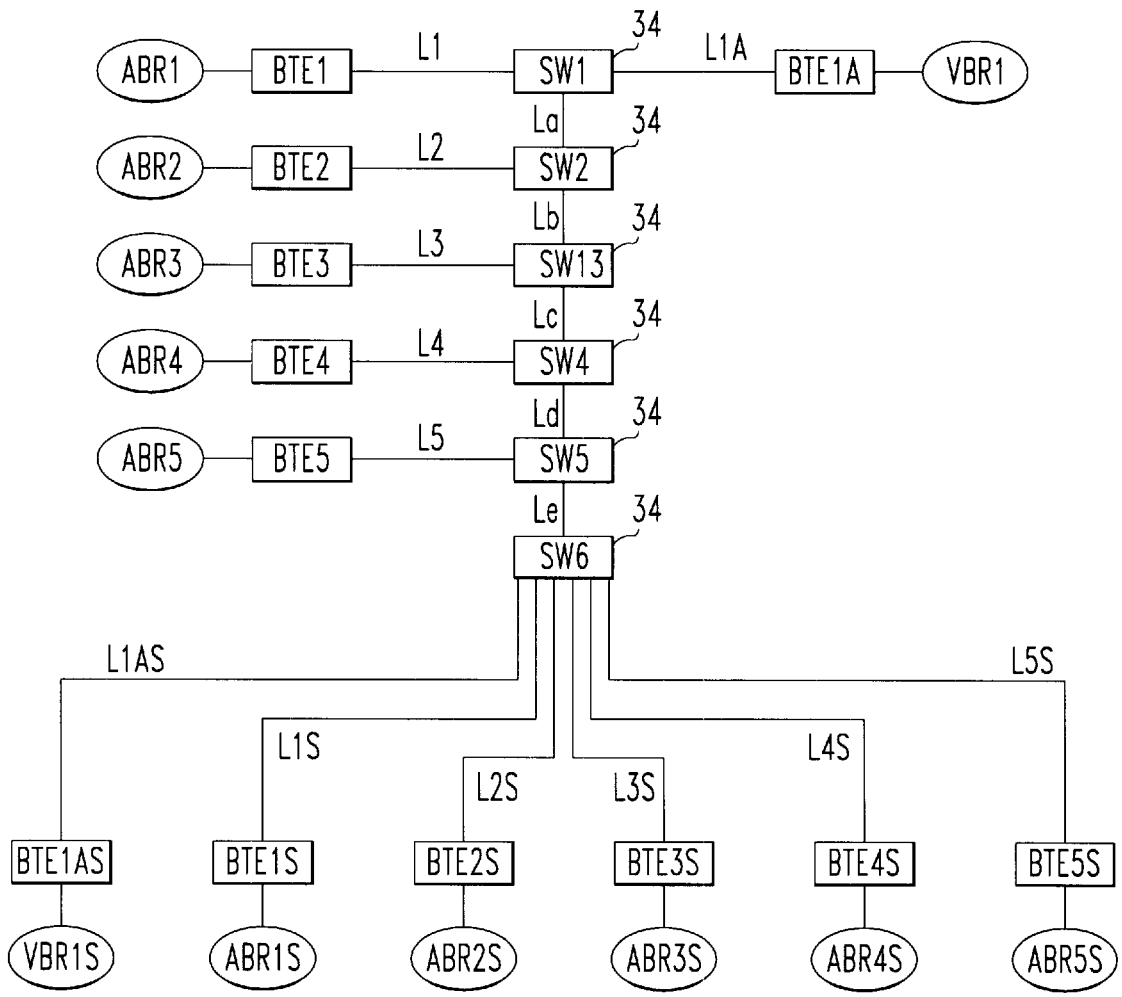
FIG. 7 shows the topology of Experiment 4.
Figure 8A:
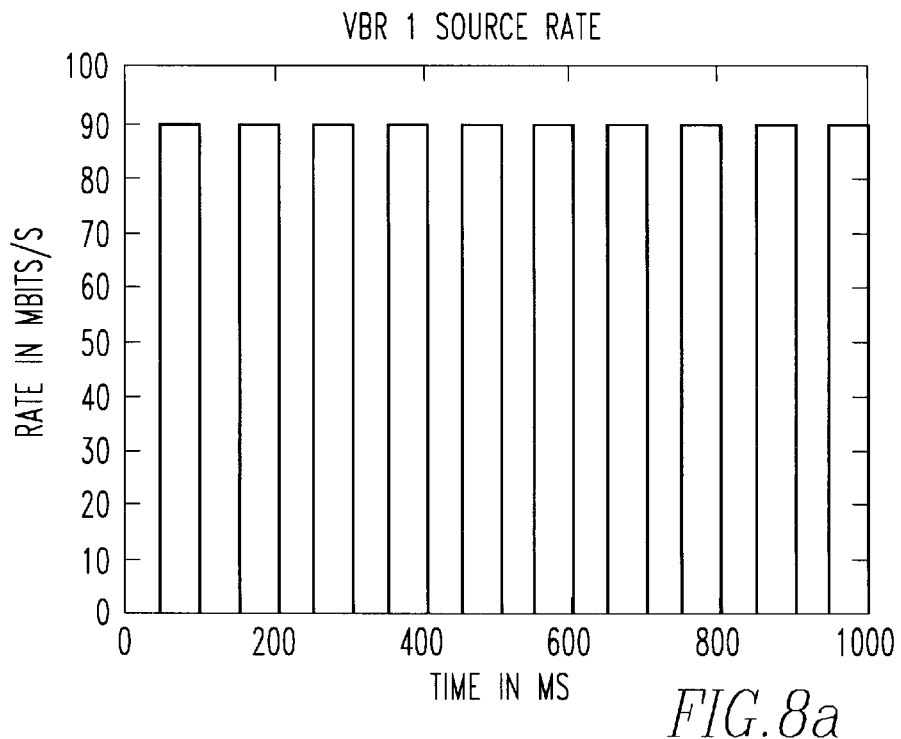
FIGS. 8a–8j show the results of Experiment 4.
Figure 8B:
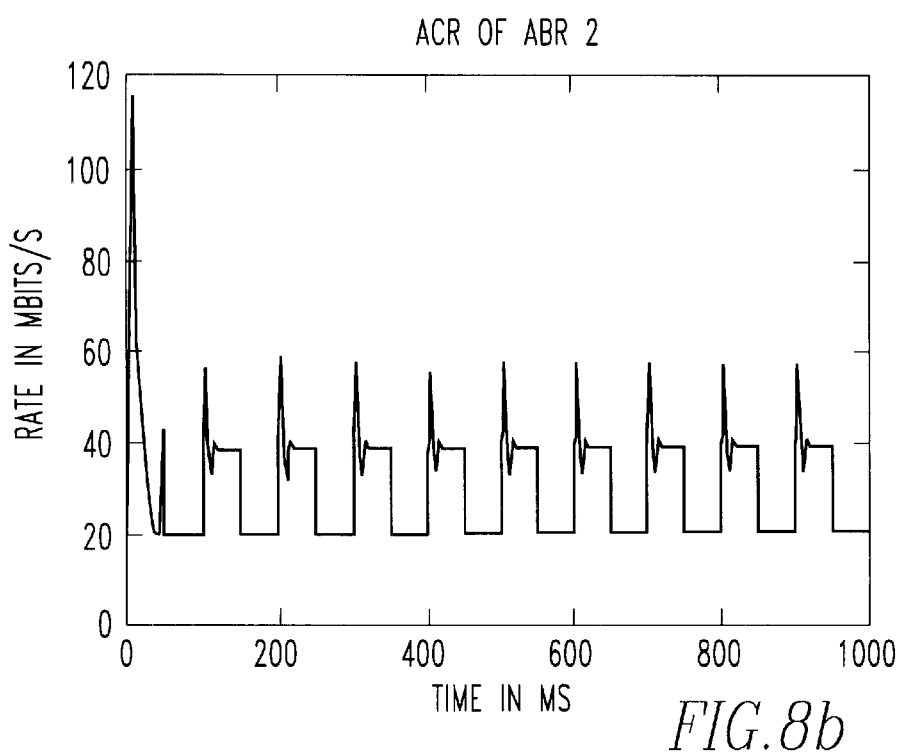
Figure 8C:
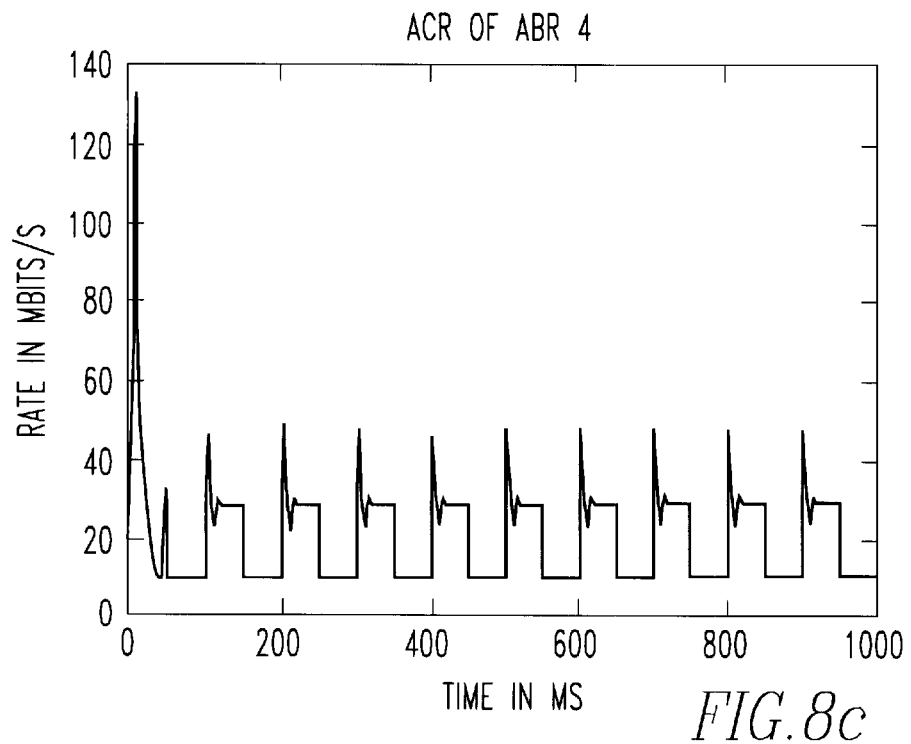
Figure 8D:
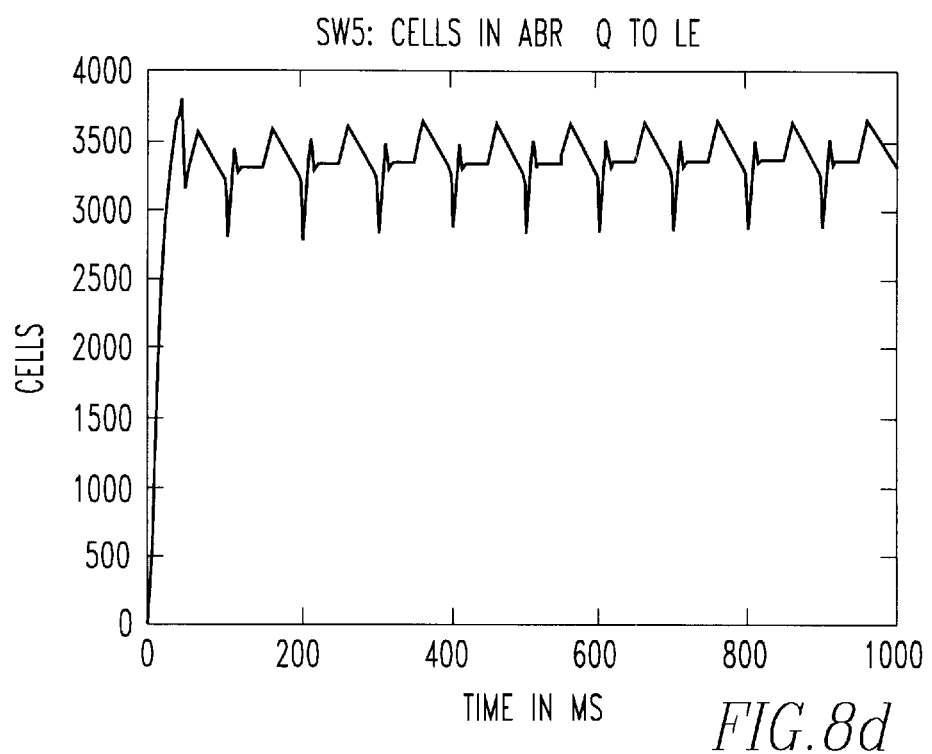
Figure 8E:
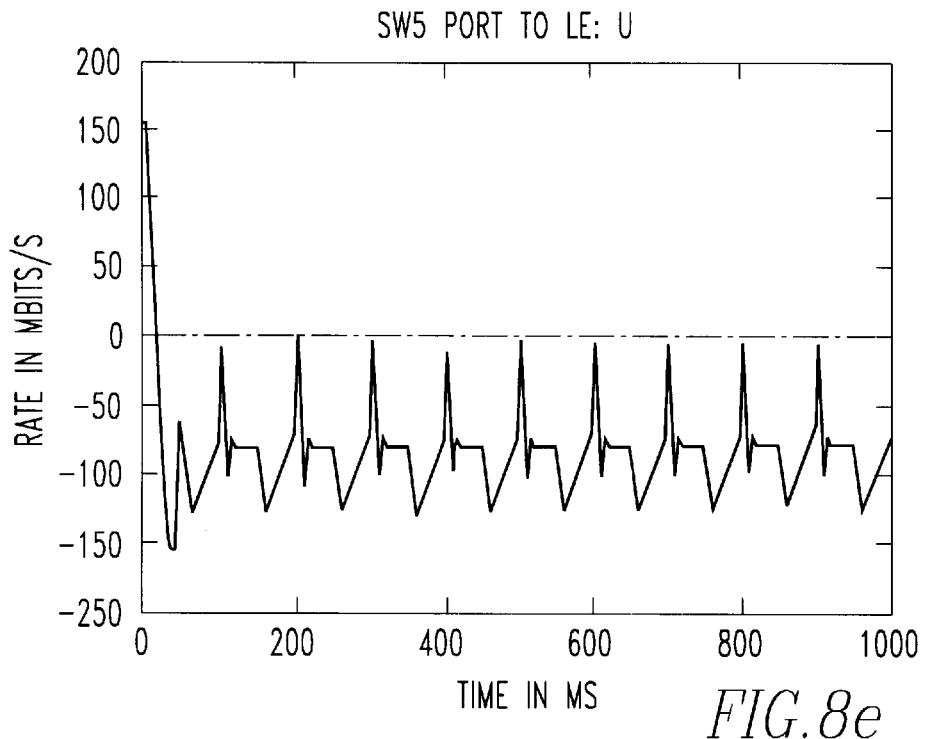
Figure 8F:
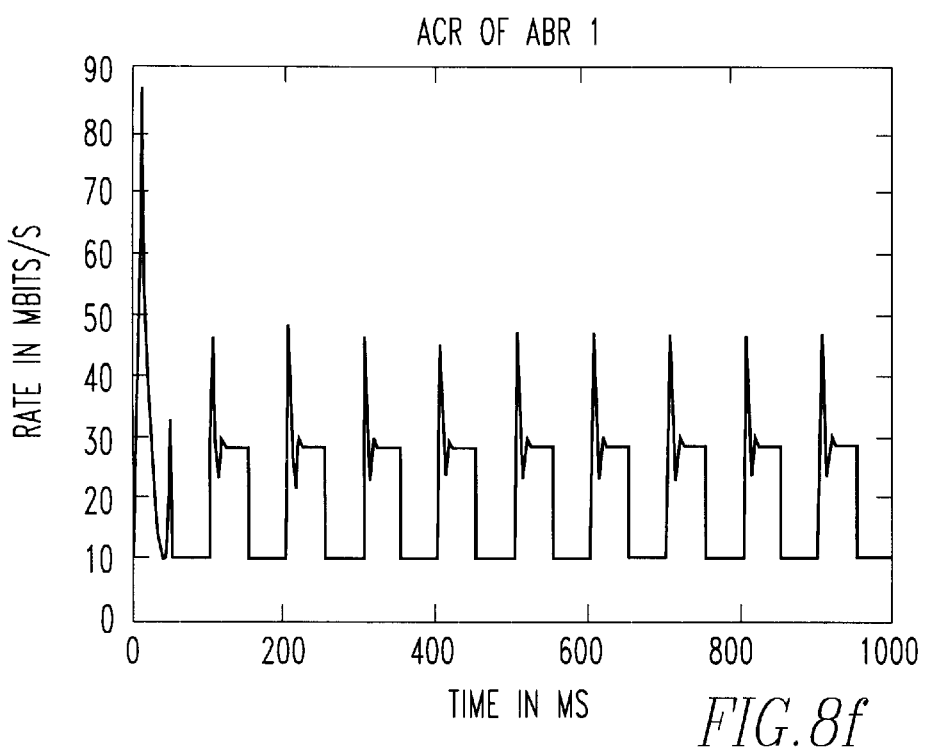
Figure 8G:
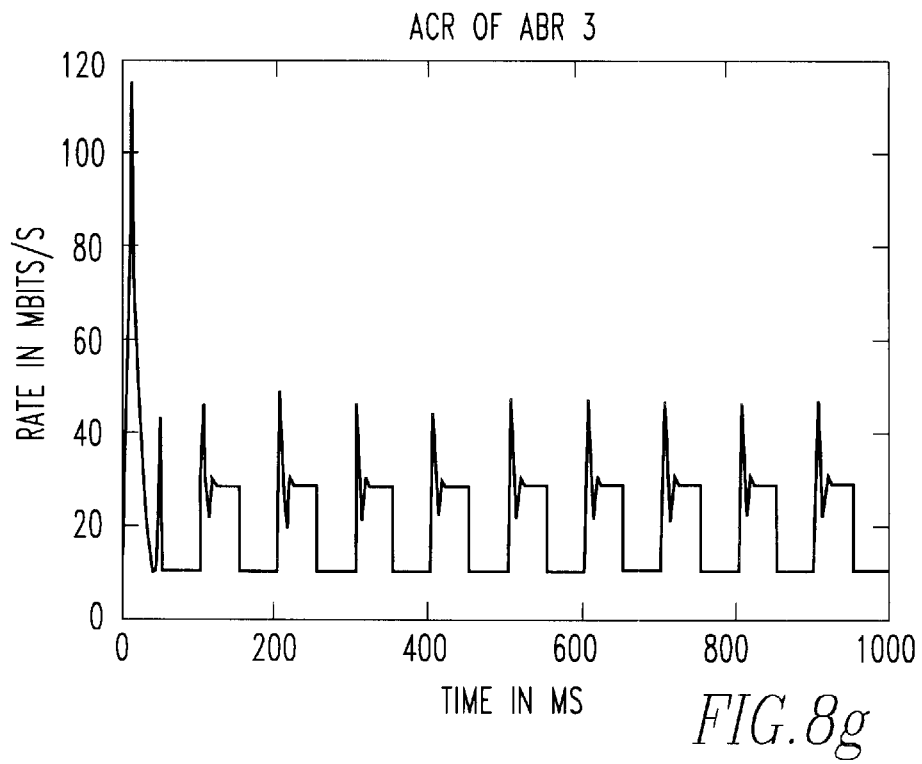
Figure 8H:
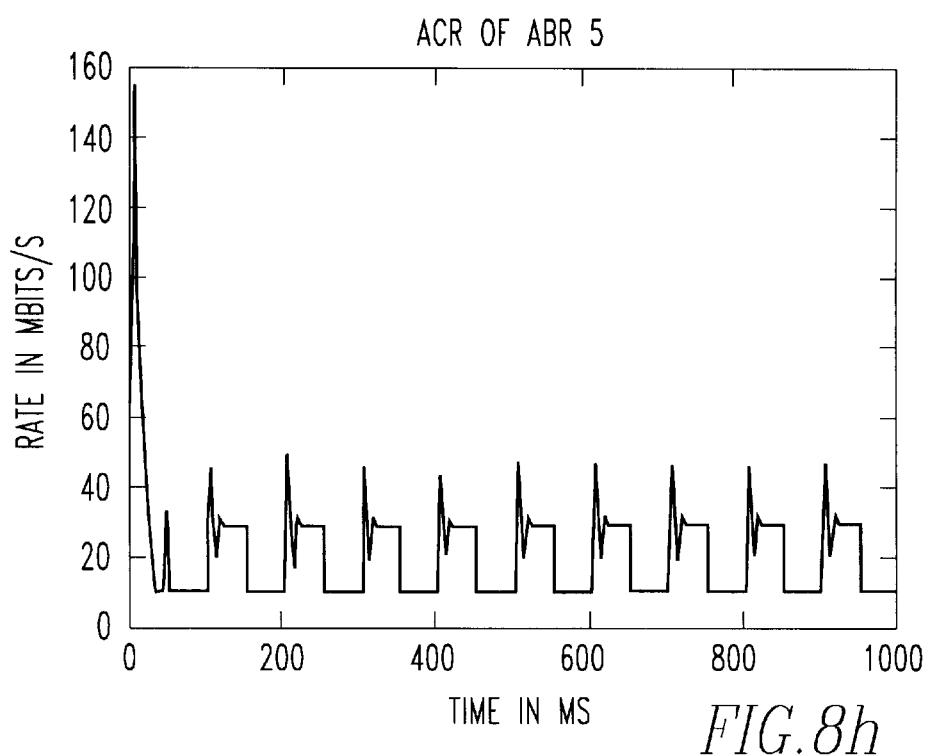
Figure 8I:
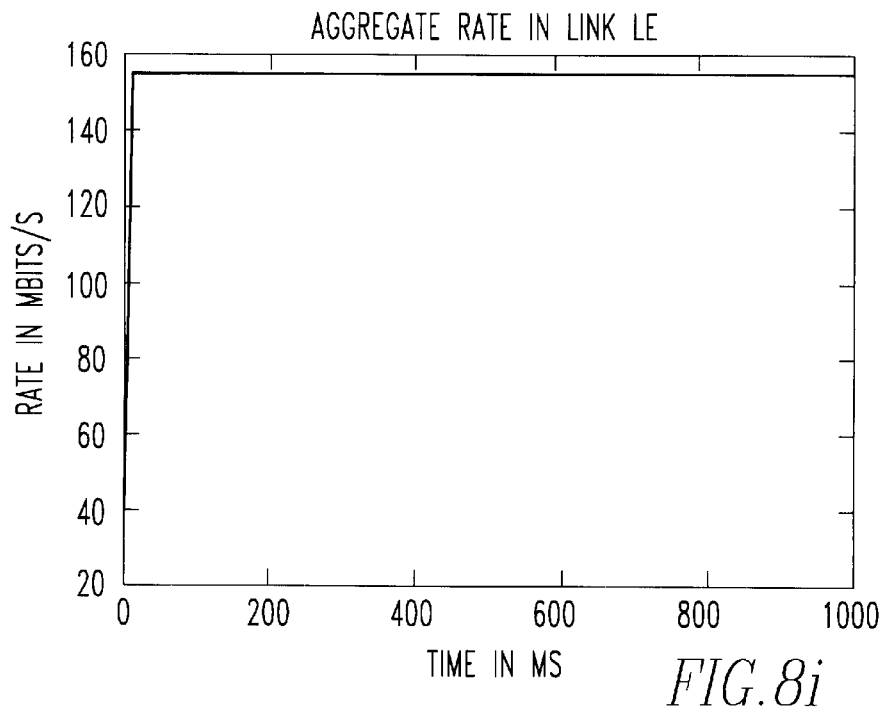
Figure 8J:
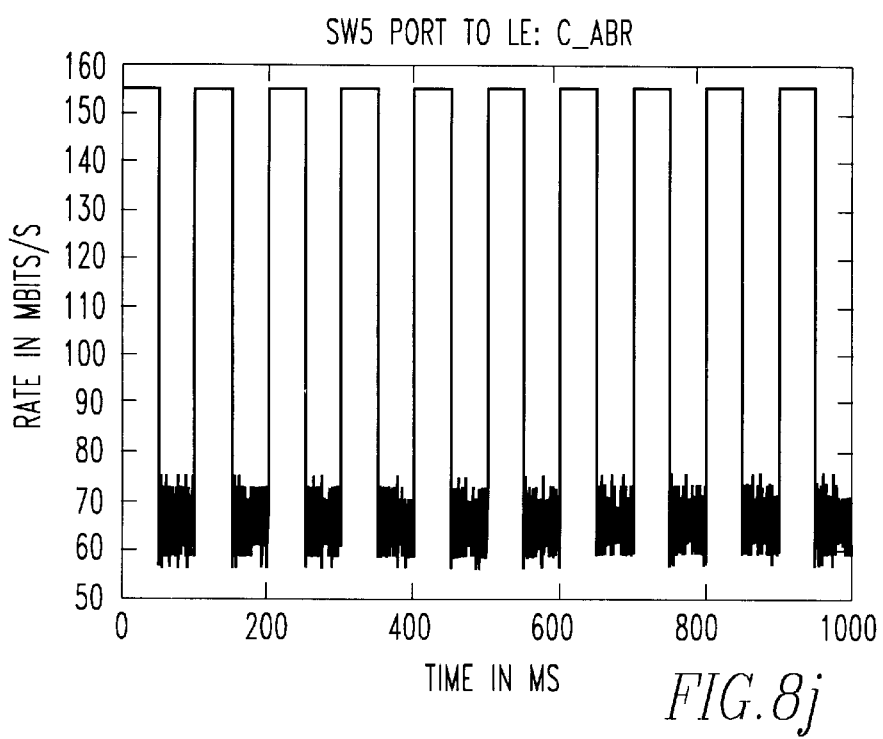

The parking lot topology is shown in FIG. 7. All the ABR VCs are persistent. The MCR of all ABR VCs is 10 Mbits/sec except that of ABR2 which is 20 Mbits/sec. The PCR of VBR1 is 90 Mbits/sec. The links L1–L5 and L1$a$ are each 10 km long whereas the central links La–Le are each 100 km long. The results of Experiment 4 are shown in FIGS. 8$a$–8$j$. The ACRs are pulse shaped with the pulse occurring when the VBR source is off. When VBR is ON, $C_{abr}$=155−90−(20+4×10)=5 Mbits/sec. So each ABR VC gets 5/5=1 Mbits/sec over their MCRs. When VBR is OFF, $C_{abr}$=155−0−(20+4×10)=95 Mbits/sec. Hence each ABR VC gets 95/5=19 Mbits/sec in addition to their MCRs.

Simulation results show that SERIA always achieves 100% link bandwidth and that the average value of ABR buffer occupancy is close to $\beta/2$=3276 cells. SERIA provides tight ABR buffer occupancy control.

Experiment 1 shows how SERIA redistributes unused bandwidth from ABR2 to other ABR VCs which are bottlenecked at the switch 34 port to achieve max-min fairness. Experiment 2, 3 and 4 results show that, unlike many of the earlier algorithms, SERIA performs well even in the presence of highly bursty VBR streams. Experiment 3 results show that SERIA is robust in handling many persistent ABR VCs. Experiment 4 results show that SERIA does not discriminate ABR VCs with longer path (i.e., does not suffer the beat-down problem).

A new exact fair share computing ABR switch 34 algorithm, SERIA, is described herein. It distributes bandwidth from VCs bottle-necked elsewhere to those bottle-necked at the switch 34 using a simple and elegant method. Other novel features of SERIA includes a buffer occupancy control mechanism which is simpler and provides stabler buffer occupancy than the previous approaches.

Simulation results show that SERIA provides max-min fairness, fast convergence to steady state, 100% link utilization and stable ABR buffer occupancy. Simulation results also show that SERIA is robust and works well in the presence of highly bursty VBR streams.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX

A Pseudo-code of SERIA output port initialization

```
init()
{
    N_bs = 0: N_bs^n = 0: U = +L: n_g = 0: Q_n = 0: Q_p = 0: q_i = 0 ∀i:
}
``` cell arrival event handler

```
cell_arrival( VC i )
{
    q_i = q_i + 1
    if ( ith VC is ABR )
    {
        Q_n = Q_n + 1
        if ( q_i == T )
            N_bs^n = N_bs^n + 1:
    }
}
``` cell departure event handler

```
cell_service_completion( VC i )
{
    q_i = q_i - 1
    if ( ith VC is CBR/VBR )
        n_g = n_g + 1:
    else if ( ith VC is ABR )
    {
        Q_n = Q_n - 1
        if ( q_i == T - 1 )
            N_bs^n = N_bs^n - 1:
    }
}
``` measuring period event handler; executed every N slots

```
N_slot_tick()
{
    /* Exponentially average the number of active ABR VCs */
    N_bs = N_bs + α_n(N_bs^n - N_bs):
    /* Compute total leftover bandwidth */
    C_abr = (N - n_g)R:
    /* Compute change in ABR buffer occupancy */
    ΔQ = Q_n - Q_p:
    Q_p = Q_n:
    /* Compute ABR buffer occupancy weighting */
    γ = Q_n/βB:
    if (ΔQ < 0)
        γ = max(1 - γ, 0):
    /* Update the additional bandwidth parameter */
    if (Q_n < N)
        U = +L:
    else if (Q_n > (B - N) )
        U = -L:
    else
    {
        U = U - α_u γ ΔQR:
        U = min(U, +L):
        U = max(U, -L):
    }
    /* Compute Fair Share */
    FS = max(C_abr + U, 0)/max(N_bs, 1);
    /* Reset number of VBR/CBR cells in period measurement */
    n_g = 0:
}
``` backward RM cell arrival event handler

-continued

```
bRM_cell_arrival()
{
    /* MCR plus equal share fairness criteria */
    cell.ER = min( cell.ER, cell.MCR + FS ):
}
```

What is claimed is:

1. An apparatus for switching cells from entities in a network comprising:

an input mechanism for receiving all cells by the apparatus from the network, the input mechanism includes J input port mechanisms, where J is greater than or equal to 2 and is an integer, wherein all the input port mechanisms together receive cells at an arrival rate;

a memory mechanism for storing all cells received by the input mechanism that are to be switched by the apparatus, said memory mechanism connected to the input mechanism, said memory mechanism having an occupancy relating to presence of cells;

an output mechanism for sending cells from the apparatus to the network;

a server for providing service to the cells at a service rate, said server connected to the memory mechanism and the output mechanism;

a scheduler for providing service to the cells as a function of the memory mechanism's occupancy by the cells, said scheduler connected to the server and the memory mechanism, the scheduler includes a mechanism for monitoring the occupancy of the memory mechanism; and a mechanism for changing the arrival rate at which cells are received by all input port mechanisms, wherein each entity has a minimum cell rate, and the changing mechanism computes the fair share of the additional bandwidth to be allocated to each entity requesting service.

2. An apparatus as described in claim 1 wherein the monitoring mechanism determines additional bandwidth available to the entities based on the difference between the arrival rate of cells to the memory mechanism and the service rate available to the cells in the memory mechanism from the server.

3. An apparatus as described in claim 2 wherein each of the input port mechanisms have an associated entity, arrival rate of cells corresponding to the associated entity, and wherein the changing mechanism changes the entity arrival rate of each of the entities providing cells through an input port mechanism so the arrival rate of cells from all input port mechanisms is equal to the service rate available to the cells in the memory mechanism from the server, said arrival rate being the sum of all entity arrival rates.

4. An apparatus as described in claim 3 wherein the changing mechanism changes the entity arrival rate of each of the entities providing cells through an input port mechanism by an equal amount.

5. An apparatus as described in claim 4 wherein the memory mechanism is comprised of either a shared memory mechanism in which all cells received by the apparatus are stored, or separate buffers, with each input port mechanism having an associated buffer which stores all the cells received only by the associated input port mechanism or separate buffers for each entity.

6. An apparatus as described in claim 5 wherein the monitoring mechanism monitors the number of entities which has a backlog of cells in the memory mechanisms waiting for service from the server.

7. An apparatus as described in claim 6 wherein the entities include ABR VCs.

8. An apparatus as described in claim 7 wherein the entities include CBR/VBR VCs.

9. An apparatus as described in claim 8 wherein the monitoring mechanism monitors the number of ABR VCs which have a backlog of cells waiting for service from the server, and the number of CBR/VBR cells ($n_{vbr}$) from CBR/VBR VCs served.

10. An apparatus as described in claim 9 wherein the additional bandwidth for sharing FS is $$FS = \frac{\max(C_{abr} + U, 0)}{\max(N_a, 1)}$$

where $C_{abr}$ is the leftover bandwidth available for ABR VCs minus the sum of minimum cell rates, MCRs, of the ABR VCs having backlog and is $$C_{abr} = (N - n_{vbr})L/N - S_a$$

where L is the output link bandwidth and N is the number of slots in a period where the monitoring mechanism measures the parameters, and $S_a$ is the exponentially averaged value of the sum of MCRs of the ABR VCs having a backlog and U is the additional bandwidth parameter and $N_a$ is the exponentially averaged value of the active ABR VCs waiting for service.

11. An apparatus as described in claim 10 wherein the monitoring mechanism determines the difference between the arrival rate of ABR cells and the service rate available to the ABR VCs based upon the rate of change of ABR memory mechanism occupancy: $\Delta Q = Q_n - Q_p$ where $Q_n$ is the aggregate ABR memory mechanism occupancy at the start of a current measuring period, and where $Q_p$ is the aggregate ABR memory mechanism occupancy at the start of a previous measuring period to the current measuring period.

12. An apparatus as described in claim 11 wherein the changing mechanism changes U until the arrival rate is equal to currently available service rate.

13. A method for switching cells comprising the steps of:

receiving cells of J entities, where J is greater than or equal to 2, from a network at an input mechanism of a switch;

storing the cells in the memory mechanism of the switch;

providing service to the cells in the memory mechanism by a server;

scheduling with a scheduler of the switch when cells in the memory mechanism are to receive service from a server of the switch as a function of the occupancy of the memory mechanism by cells;

monitoring with a monitoring mechanism of the scheduler the occupancy of the memory;

changing the arrival rate of cells to all input port mechanisms of the input mechanism as a function of the memory mechanism's occupancy by the cells with a changing mechanism so the arrival rate of cells received by the switch to the memory mechanism is equal to the server rate available to the cells in the memory mechanism from the server;

determining additional bandwidth available to the entities based on the difference between the arrival rate of the cells to the memory mechanism and the service rate available to the cells in the memory mechanism from the server; and computing the fair share of the additional bandwidth to be allocated to each of the entities requesting service, wherein each entity has a minimum cell rate.

14. A method as described in claim 13 wherein the additional bandwidth for sharing FS is $$FS = \frac{\max(C_{abr} + U, 0)}{\max(N_a, 1)}$$

where $C_{abr}$ is the leftover bandwidth available for ABR VCs minus the sum of minimum cell rates, MCRs, of the ABR VCs having backlog and is $$C_{abr} = (N - n_{vbr})L/N - S_a$$

where L is the output link bandwidth and N is the number of slots in a period where the monitoring mechanism measures the parameters, and $S_a$ is the exponentially averaged value of the sum of MCRs of the ABR VCs having a backlog and U is the additional bandwidth parameter and $N_a$ is the exponentially averaged value of the active ABR VCs waiting for service.

15. An ATM switch which stamps Explicit Rate to ABR VCs for controlling ABR traffic flow on a given link of the ATM switch comprising:

input port mechanisms carrying traffic for VCs into the switch;

a memory mechanism for storing all cells of VCs received by the input port mechanisms that are to be switched by the switch, said memory mechanism connected to the input port mechanisms, said memory mechanism having an occupancy for cells of VCs;

output port mechanisms for sending cells from the switch to the network;

a switching fabric to switch a cell of a VC from an input port mechanism to an output port mechanism;

an ABR-ER mechanism for computing explicit rate (ER) and computing stamping rate on backward RM cells, each ABR VC has a minimum cell rate, and the ABR-ER mechanism computes a fair share of the additional bandwidth to be allocated to each of the ABR VCs requesting service;

a server for providing service to the cells of VCs at a service rate, said server connected to the memory mechanism and the output port mechanisms; and a scheduler for providing service to the cells of the VCs as a function of the memory mechanism's occupancy by the cells of the VCs, and said scheduler connected to the server and the memory mechanism.

16. A switch as described in claim 15 wherein the ABR-ER mechanism includes a mechanism for monitoring the occupancy of the memory mechanism, and varying the ER computing function as a function of the memory mechanism's occupancy.

17. A switch as described in claim 16 wherein the ABR-ER mechanism determines additional bandwidth available to the ABR VCs based on the service rate available to the cells of the ABR VCs from the server.

18. A switch as described in claim 17 wherein the ABR-ER mechanism computes the rate to be stamped to each ABR VC source such that the total arrival rate of all cells of VCs from all entities is equal to the service rate available to the cells in the memory mechanism from the server.

19. A switch as described in claim 18 wherein the memory mechanism is compised of either a shared memory mechanism in which all cells of VCs received by the apparatus are stored, or separate buffers, with each VC having an associated buffer which stores all the cells of the VC.

20. A switch as described in claim 19 wherein the ABR-ER mechanism monitors the number of ABR VCs which have a backlog of cells in the memory mechanism waiting for service from server.

21. A switch as described in claim 20 wherein the ABR-ER mechanism monitors the number of active ABR VCs, $N_a$, the number of cells belonging to CBR/VBR VCs, $n_{vbr}$ and optionally the sum of the MCRs of the active ABR VCs, $S_a$, during a measurement interval of a preset length of time, N cell slots.

22. A switch as described in claim 21 wherein the measured quantities such as $N_a$ and $S_a$ are partially or fully exponentially averaged to reduce rapid changes.

23. A switch as described in claim 22 wherein from the measurements, the ABR-ER mechanism computes the total bandwidth, $C_{abr}$, available for ABR VCs on top of their MCRs:

$$C_{abr} = (N - n_{vbr})L/N - S_a.$$

24. A switch as described in claim 23 wherein the ABR-ER mechanism maintains a parameter called the Additional Bandwidth parameter, U, which (a) redistributes bandwidth unused by VCs which are backlogged elsewhere to those which are backlogged at the switch, and (b) compensates for incorrect or no measurements of quantities such as $S_a$.

25. A switch as described in claim 24 wherein when using a MCR plus equal share fairness criterion, the ER computing mechanism computes the fair share, FS, of the available bandwidth as $$FS = \max(C_{abr} + U, 0)/\max(N_a, 1).$$

26. A switch as described in claim 25 wherein when using a Proportional to MCR fairness criterion, the ER computing mechanism computes the fair share of the ith ABR VC, $FS_i$ as $$FS_i = \max(C_{abr} + U, 0) \, MCR_i/\max(S_a, 1).$$

27. A switch as described in claim 26 wherein the ABR-ER mechanism can satisfy all the fairness criteria identified by ATM Forum TM 4.0.

28. A switch as described in claim 27 wherein the additional bandwidth parameter is computed using the ABR buffer occupancy, $Q_n$, and the rate of change of ABR buffer occupancy, DeltaQ.

29. A switch as described in claim 28 wherein U is computed as:

if $Q_n$<N then U=+L;

else if $Q_n$>(B−N) then U=−L;

else U=U−alpha*gamma*DeltaQ*L/N endif where B is the ABR buffer size, alpha is the exponentially averaging factor and gamma is the ABR buffer occupancy weighting function.

30. A switch as described in claim 29 wherein the ABR buffer occupancy weighting function provides tight queue control and prevents ABR buffer occupancy drifting.

31. A switch as described in claim 30 wherein gamma is computed as:

gamma=Qn/B if DeltaQ<0 then gamma=max(1−gamma, 0) endif.

32. A switch as described in claim 31 wherein the ABR-ER mechanism computes the explicit rate, ER, of and ABR VC by adding the VC's FS to its MCR.

* * * * *